(12) United States Patent
Katsukura et al.

(10) Patent No.: US 6,736,609 B2
(45) Date of Patent: May 18, 2004

(54) SUPPORT APPARATUS FOR MOVABLE MEMBER AND PUMP APPARATUS

(75) Inventors: Shozo Katsukura, Sabae (JP); Mikine Katsukura, Sabae (JP); Masao Furukawa, Tokyo (JP); Koji Miyazaki, Fukui (JP); Yuji Aoyagi, Fukui (JP); Naoki Miyagi, Yokohama (JP)

(73) Assignees: Fukui Prefecture, Fukui (JP); National Space Development Agency of Japan, Ibaraki (JP); Japan Space Forum, Tokyo (JP)

( * ) Notice: Subject to any disclaimer, the term of this patent is extended or adjusted under 35 U.S.C. 154(b) by 0 days.

(21) Appl. No.: 10/100,056

(22) Filed: Mar. 19, 2002

(65) Prior Publication Data

US 2003/0072666 A1 Apr. 17, 2003

(30) Foreign Application Priority Data

Mar. 19, 2001 (JP) ........................................ 2001-079595

(51) Int. Cl.$^7$ ............................. F04B 17/00; F04B 35/00
(52) U.S. Cl. ...................... 417/365; 384/114; 384/907.1
(58) Field of Search ..................... 417/365; 418/206.7, 418/206.8, 206.9; 427/230, 249; 384/114, 121, 107, 387, 907.1; 508/109

(56) References Cited

U.S. PATENT DOCUMENTS

| 4,342,491 A | * | 8/1982 | Jamison et al. ............. 308/239 |
| 4,731,302 A | | 3/1988 | Weissmantel et al. ....... 428/698 |
| 5,366,298 A | * | 11/1994 | Toshimitsu et al. ......... 384/107 |
| 5,747,631 A | | 5/1998 | Sasaki et al. ................. 528/86 |
| 5,765,392 A | | 6/1998 | Baur ........................... 62/473 |
| 6,114,791 A | * | 9/2000 | Ito et al. ..................... 310/233 |
| 6,502,991 B2 | * | 1/2003 | Knepper et al. ............. 384/110 |

FOREIGN PATENT DOCUMENTS

| CA | 2314130 | | 5/1994 | ............ F25B/9/00 |
| EP | 0600468 A1 | | 6/1994 | ............ F16C/32/06 |
| EP | 0752538 A2 | | 1/1997 | ............ F16C/33/04 |
| GB | 470014 | | 8/1937 | |
| GB | 1259672 | | 1/1972 | ............ F16C/17/00 |
| GB | 1279827 | | 6/1972 | ............ F16C/33/06 |
| JP | 05-296248 | * | 11/1993 | |
| JP | 6-193637 | | 7/1994 | ............ F16C/33/32 |
| JP | 7-53260 | | 2/1995 | |
| JP | 7-259749 | | 10/1995 | |
| JP | 9-203381 | | 8/1997 | |
| JP | 10-112949 | | 4/1998 | ............ H02K/3/30 |
| JP | 11-292526 | | 10/1999 | ............ C01B/31/02 |
| JP | 2000-213533 | * | 8/2000 | |
| JP | 2001-032840 | * | 2/2001 | |

* cited by examiner

Primary Examiner—Justine R. Yu
Assistant Examiner—Han L Liu
(74) Attorney, Agent, or Firm—Wenderoth, Lind & Ponack, L.L.P.

(57) ABSTRACT

A pump apparatus of simple construction has a bearing structure for which a lubricant is unnecessary. A flow passage for a refrigerant (liquid ammonia) is formed in a housing to provide communication between a suction port and a discharge port, and slide bearing members formed of amorphous carbon are provided in the housing to be fitted into the flow passage to support a rotating shaft. A drive for rotating the rotating shaft is constituted by a rotor, which is fitted into the flow passage and provided with the rotating shaft, and a stator, which is provided outside the housing to surround the rotor, and a pump body is provided midway the flow passage and connected to the rotating shaft to pump a fluid.

13 Claims, 27 Drawing Sheets

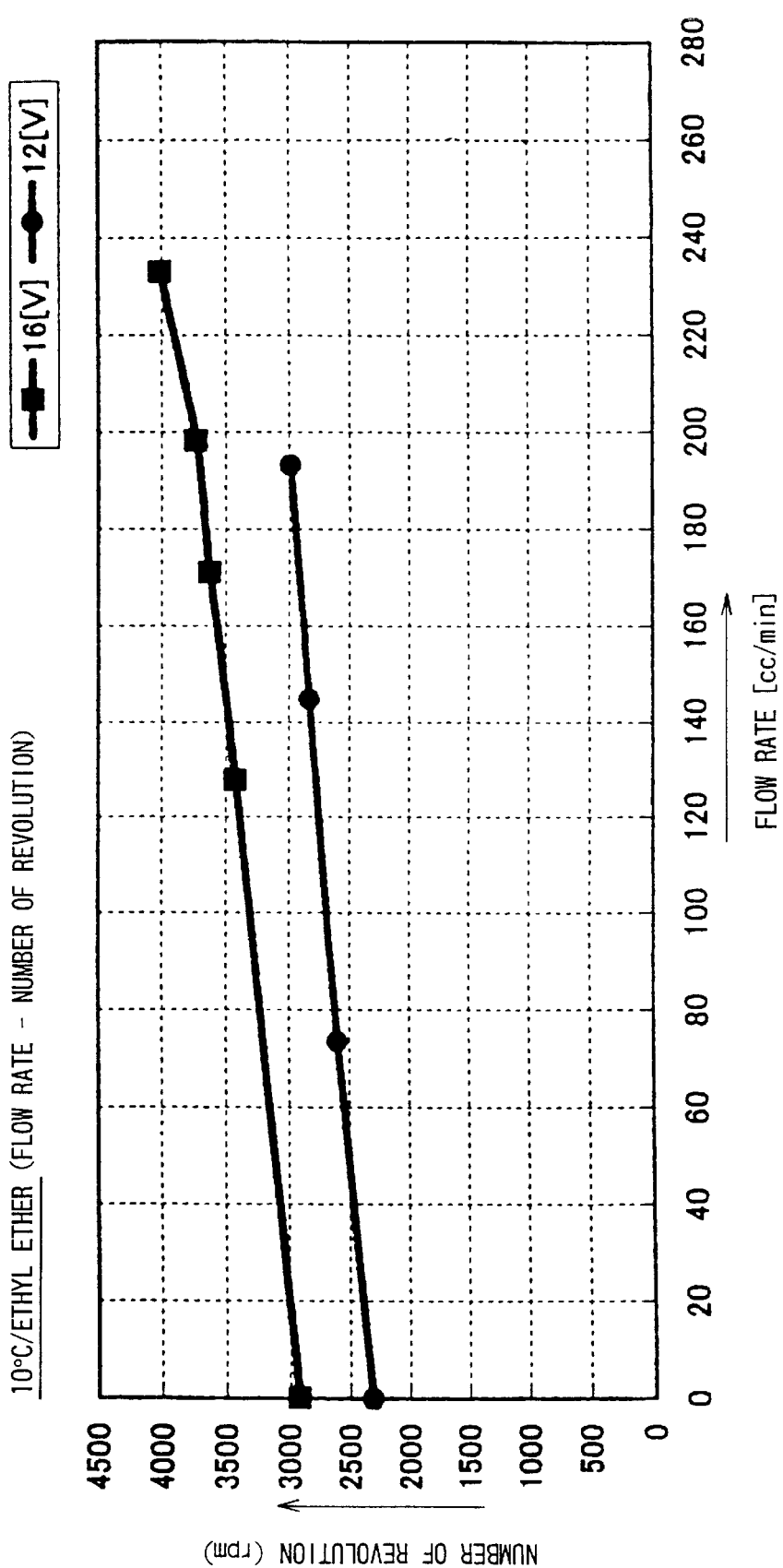

SUPPORT APPARATUS FOR MOVABLE MEMBER AND PUMP APPARATUS

BACKGROUND OF THE INVENTION

1. Field of the Invention

The invention relates to a support apparatus provided with a member for displaceably supporting a movable member such as a rotating shaft, and a pump apparatus.

2. Description of the Related Art

Space equipment such as artificial satellites, space stations or the like, and other equipment used in outer space include many kinds of drive mechanisms in which a support apparatus, such as ball-and-roller bearing apparatuses, ball screw apparatuses, linear guide apparatuses and the like, for displaceably supporting a movable member is used. Fluoro grease is used as a lubricant in a support apparatus for use on earth, but evaporates in outer space is responsible for contamination of various equipment and decomposition due to radioactive rays, and so cannot be used there. In a support apparatus for equipment used in outer space, molybdenum dioxide, lead or silver is used, which is low in torque and stable.

As described above, equipment used in outer space, in particular, equipment used over a long term in artificial satellites, space stations or the like, are exceedingly difficult in the exchange of parts, and required high durability. A support apparatus for supporting a movable member provided in such equipment is desirably made simple in construction for the purpose of less failure, and constructed to dispense with the use of lubricant for preventing a degraded performance due to changes in the lubricant.

SUMMARY OF THE INVENTION

It is an object of the invention to provide a support apparatus which is simple in construction and dispenses with lubricant.

Also, it is an object of the invention to provide a pump apparatus which is simple in construction and provided with a bearing structure for supporting a rotating shaft, and which dispenses with lubricant.

The invention provides a support apparatus for displaceably supporting a movable member comprising slide members for slidably supporting the movable member, the slide members being formed of amorphous carbon.

According to the invention, a movable member can be supported by slide members formed of amorphous carbon. Amorphous carbon is high in abrasion resistance and possesses a low frictional property called a self-lubricating property, and slide members formed of amorphous carbon are used to smoothly slide relative to a movable member to, without using lubricant, enable supporting the movable member so that the movable member can be smoothly displaced. Accordingly, it is possible to obtain a support apparatus that is simple in construction and supports a movable member without the use of lubricant to enhance the durability of the support apparatus.

In the invention, it is preferable that the movable member comprises a rotating shaft and the slide members are slide bearing members for rotatably supporting the rotating shaft.

According to the invention, the slide bearing members formed of amorphous carbon can support the rotating shaft. It thereby is possible to reduce a gap between the rotating shaft and the slide bearing members and rotatably support the rotating shaft so as to cause stable rotation of the rotating shaft.

In the invention it is preferable that the slide members are arranged in a space in which a fluid is contained.

According to the invention, the slide members are formed of amorphous carbon and possess chemical resistance, so they are not subjected to chemical change by a fluid even when being provided in a space in which a fluid is contained. Besides, even if the fluid is one, either a strong acid or strong base, liable to chemically affect a mating member, the slide members are not subjected to chemical change by the fluid. The slide members can thereby preserve the function as slide members over a long term without being damaged by the fluid. Accordingly, the slide members can be suitably used in fluid flow passages.

In the invention, it is preferable that a gap between the movable member and the slide members is dimensioned to allow entry of the fluid due to the capillary phenomenon.

According to the invention, a fluid in the space enters between the movable member and the slide members. The slide members formed of amorphous carbon are not restricted in lubricant as in the case of slide members of metal, but can use a wide variety of fluids as lubricant. As described above, while lubricant is essentially unnecessary, the use of lubricant makes it possible to support the movable member in a further smoothly displaceable manner. Accordingly, a fluid in the gap can be used as lubricant so that a supporting state can be achieved to realize smooth displacement of the movable member.

In the invention, it is preferable that the fluid is liquid ammonia. According to the invention, the slide members possess chemical resistance, and are not subjected to chemical change even when a fluid is liquid ammonia, so that they can preserve their function as slide members over a long term. Moreover, it is possible to make use of liquid ammonia as a favorable lubricant. Accordingly, the slide bearing members can be favorably used in a space in which liquid ammonia is contained.

In the invention it is preferable that the support apparatus is mounted on equipment used in outer space.

According to the invention, the support apparatus can be enhanced in durability, so that it is suitably usable for equipment, such as artificial satellites, space stations or the like, which are used in outer space, and whose parts are difficult to exchange.

The invention provides a pump apparatus comprising a rotating shaft, slide bearing members formed of amorphous carbon for rotatably supporting the rotating shaft, drive means for drivingly rotating the rotating shaft and a pump body connected to the rotating shaft, for pumping a fluid.

According to the invention, the drive means is used to drive the rotating shaft to drive the pump body connected to the rotating shaft to discharge a fluid. The rotating shaft is rotatably supported by a bearing apparatus having slide bearing members. The slide bearing members are formed of amorphous carbon. Amorphous carbon is high in abrasion resistance and possesses a low frictional property called a self-lubricating property, and slide bearing members formed of amorphous carbon are used to smoothly slide relative to the rotating shaft to, without using lubricant, enable supporting the rotating shaft so that the rotating shaft can be smoothly rotated. Accordingly, it is possible to obtain a bearing apparatus which is simple in construction and supports the rotating shaft without the use of lubricant to enhance durability of the bearing apparatus, thus of the pump apparatus.

In the invention it is preferable that the pump apparatus further comprises a housing having a fluid flow passage which provides communication between a suction port and a discharge port, and that the rotating shaft is arranged in the housing, the slide bearing members are fitted in the fluid flow passage in the housing, the drive means comprises a rotor fitted in the fluid flow passage to be provided on the rotating shaft and a stator provided outside the housing to surround the rotor, and the pump body is provided midway of the fluid flow passage.

According to the invention, the drive means is used to drive the rotating shaft to drive the pump body connected to the rotating shaft so that a fluid sucked through a suction port is made to flow down the flow passage to be discharged through a discharge port. In this pump apparatus, the rotating shaft, the slide bearing members and the rotor are fitted into the flow passage. In this manner, the provision of the rotating shaft, the slide bearing members and the rotor in the flow passage eliminates the need of providing rotating constituents both inside and outside the flow passage through the housing, so that the whole pump apparatus can be made favorable in sealing quality relative to leakage of the fluid, the sealing construction can be made simple, and the pump apparatus can be made small in size.

With such construction, the slide bearing members are formed of amorphous carbon and possess chemical resistance, so they are not subjected to chemical change by a fluid even when being provided in a space in which a fluid is contained. Besides, even if the fluid is one, either strong acid or strong base, liable to chemically affect a mating member, the slide members are not subjected to chemical change by the fluid. The slide bearing members can thereby preserve the function as slide bearing members over a long term without damage by the fluid.

In the invention, it is preferable that a gap between the rotating shaft and the slide bearing members is dimensioned to allow entry of the fluid due to the capillary phenomenon.

According to the invention, a fluid in the flow passage enters between the rotating shaft and the slide bearing members. The slide bearing members formed of amorphous carbon are not restricted in lubricant as in the case of slide bearing members of metal, but can use a wide variety of fluids as lubricant. As described above, while lubricant is essentially unnecessary, the use of lubricant makes it possible to support the rotating shaft in a further smoothly displaceable manner. Accordingly, the fluid in the flow passage can be used as lubricant and so a pump apparatus can be achieved to provide for further smooth rotation of the rotating shaft.

In the invention it is preferable that the pump apparatus is a pump for circulating a refrigerant and the fluid is liquid ammonia as the refrigerant.

According to the invention, the slide bearing members possess chemical resistance, and are not subjected to chemical change even when the fluid is liquid ammonia, so that they can preserve the function as slide bearing members over a long term. Moreover, the slide bearing members can make use of liquid ammonia as a favorable lubricant. Without the use of freon gas, for the sake of global environmental protection, such liquid ammonia is used as a refrigerant favorably in the pump apparatus, in which the refrigerant is circulated.

Also, liquid ammonia as refrigerant can be used to cool the rotating shaft, the slide bearing members and the rotor and to maintain a stable performance of the pump.

In the invention it is preferable that the pump body is formed of amorphous carbon.

According to the invention, the pump body is formed of amorphous carbon, and so is not susceptible to chemical influences, whereby it is possible to realize a favorable pump apparatus that keeps the function of the pump body over a long term.

In the invention, it is preferable that the slide bearing members are radial bearings to bear the radial load of the rotating shaft, and the pump body is formed of amorphous carbon to bear the thrust load of the rotating shaft.

According to the invention, formation of the pump body of amorphous carbon can have the pump body fulfilling the function of thrust bearings and bearing the thrust load of the rotating shaft. Therefore, the load on the slide bearing members can be reduced. In this manner, load is imposed on the pump body to make it possible to reduce the slide bearing members in size and enhance durability of the pump apparatus.

In the invention, it is preferable that the pump apparatus is mounted on equipment used in outer space.

According to the invention, the pump apparatus can be enhanced in durability so that it is suitably usable for equipment, such as artificial satellites, space stations or the like, which are used in outer space, of which parts are difficult to exchange.

BRIEF DESCRIPTION OF THE DRAWINGS

Other and further objects, features, and advantages of the invention will be more explicit from the following detailed description taken with reference to the drawings wherein:

FIG. 42 is a graph showing the relationship between number of revolutions and flow rate of the pump apparatus 1 making use of ethyl ether at 10° C.

DETAILED DESCRIPTION OF THE PREFERRED EMBODIMENTS

Figure 1:
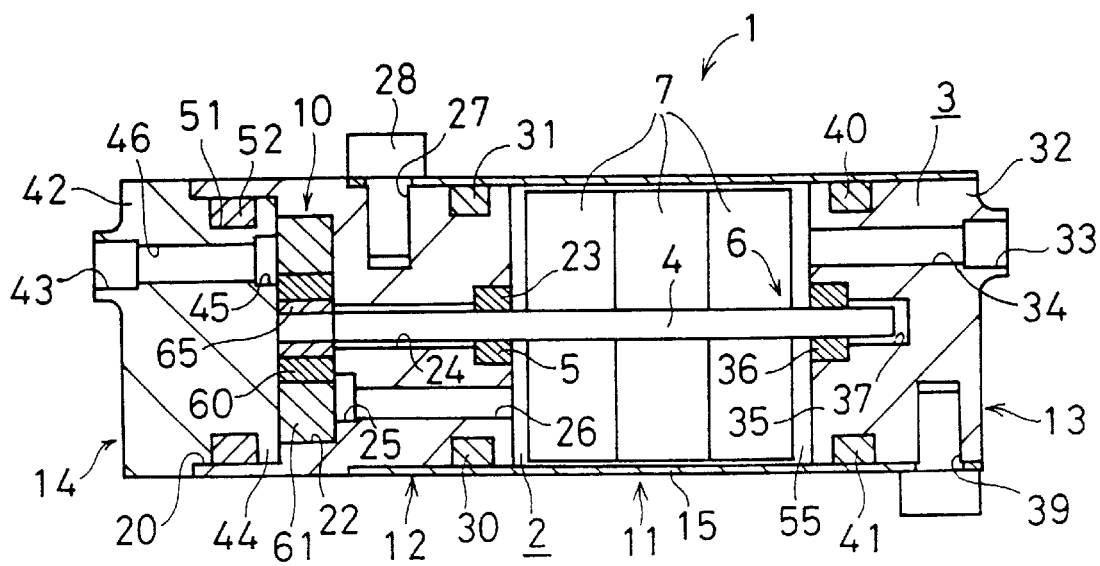
FIG. 1 is a cross sectional view showing a pump apparatus 1 according to an embodiment of the invention.

Now referring to the drawings, preferred embodiments of the invention are described below.

Figure 2:
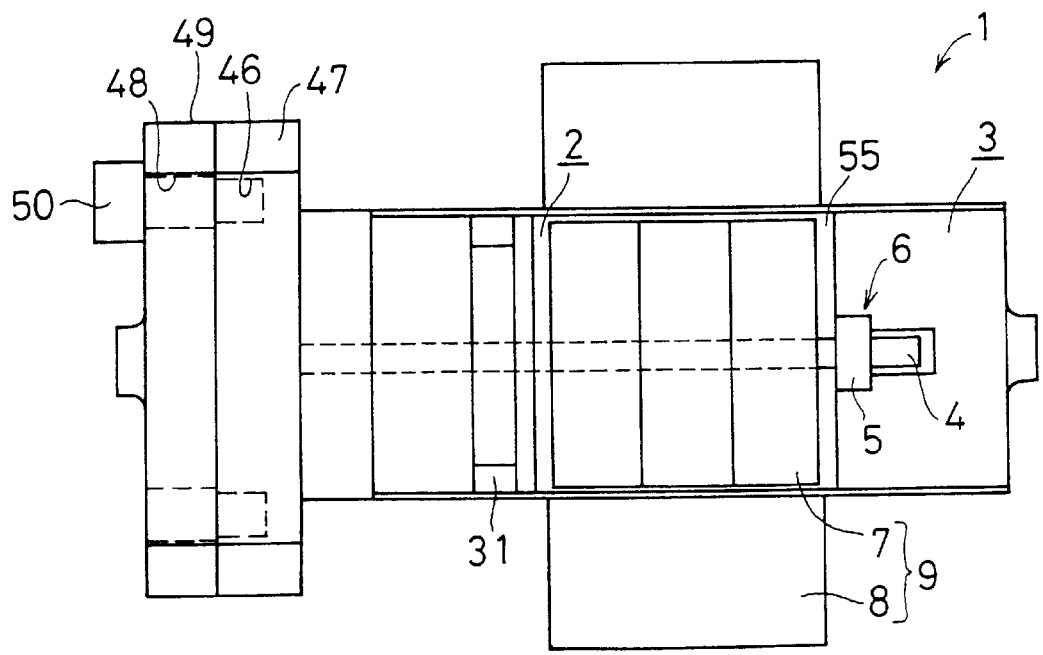
FIG. 2 is a cross sectional view of the pump apparatus 1 of FIG. 1 as viewed from above of FIG. 1.
Figure 3:
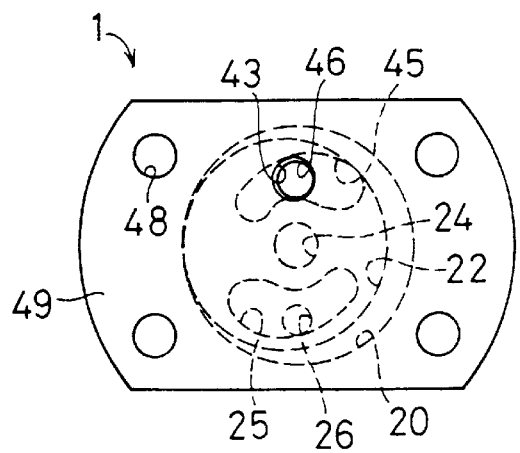
FIG. 3 is a left side view of the pump apparatus 1 of FIG. 1.
Figure 4:
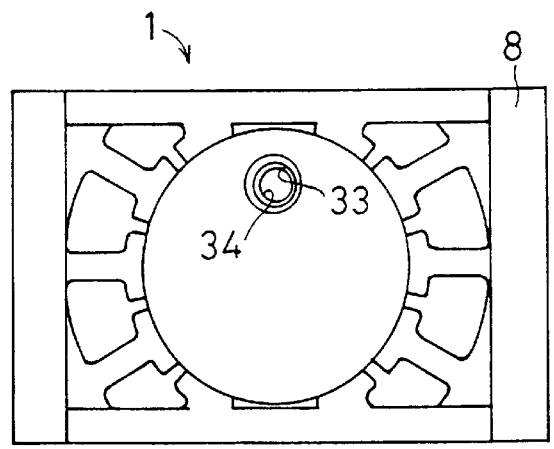
FIG. 4 is a right side view of the pump apparatus 1 of FIG. 1.

FIG. 1 is a cross sectional view showing a pump apparatus 1 according to an embodiment of the invention, FIG. 2 being a cross sectional view showing the pump apparatus 1 as viewed from above FIG. 1, FIG. 3 being a left side view showing the pump apparatus 1 of FIG. 1, and FIG. 4 being a right side view showing the pump apparatus 1 of FIG. 1. The pump apparatus 1 is an apparatus for feeding a liquid, the apparatus being mounted on, for example, space equipment such as artificial satellites, space stations or the like, and equipment used in outer space outside the stratosphere, and serves to circulate a refrigerant which makes heat exchange with other apparatuses mounted on the equipment. The pump apparatus 1 comprises a housing 3 formed with a refrigerant flow passage 2, a rotating shaft 4 provided in the housing 3, a bearing structure 6 having slide bearing members 5 which rotatably support the rotating shaft 4, a motor 9 having a rotor 7 and a stator 8, and a pump body 10 connected to the rotating shaft 4. For the sake of global environmental conservation, iron freon gas is not used for the refrigerant, but liquid ammonia is used.

Figure 5:
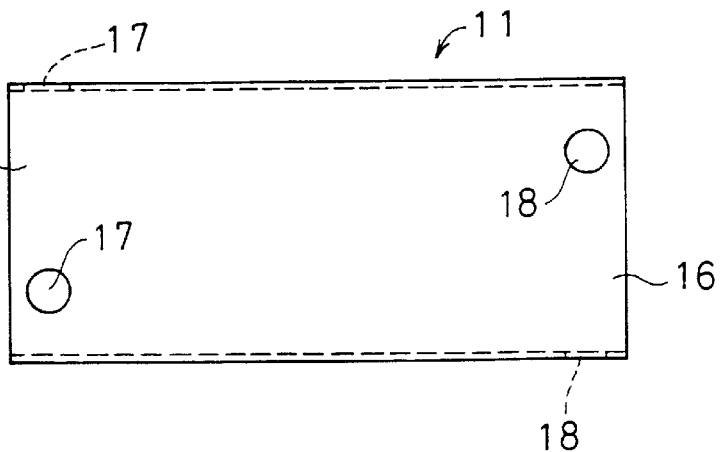
FIG. 5 is a front view showing a cylindrical-shaped member 11 constituting a housing 3.
Figure 6:
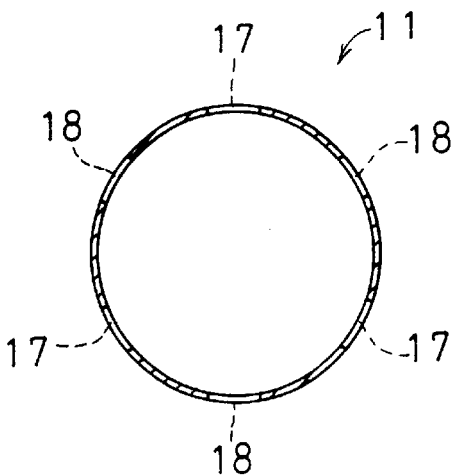
FIG. 6 is a right side view of the cylindrical-shaped member 11 of FIG. 5.
Figure 7:
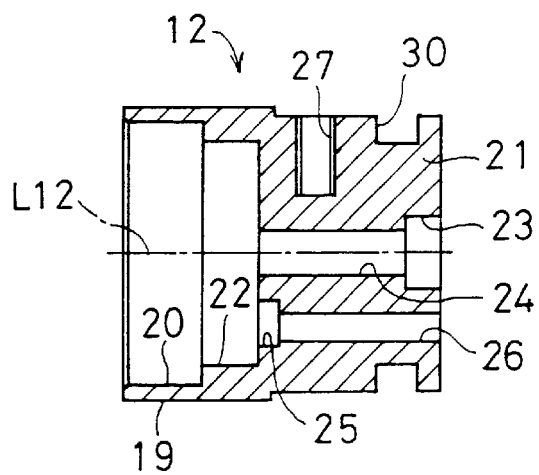
FIG. 7 is a cross sectional view showing a pump chamber forming member 12 constituting the housing 3.
Figure 8:
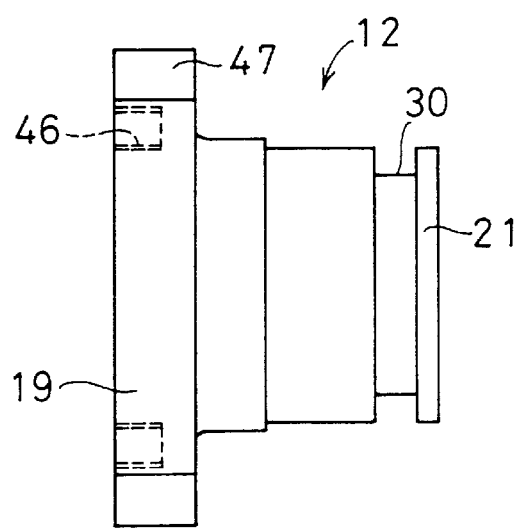
FIG. 8 is a plan view of the pump chamber forming member 12 of FIG. 7.
Figure 9:
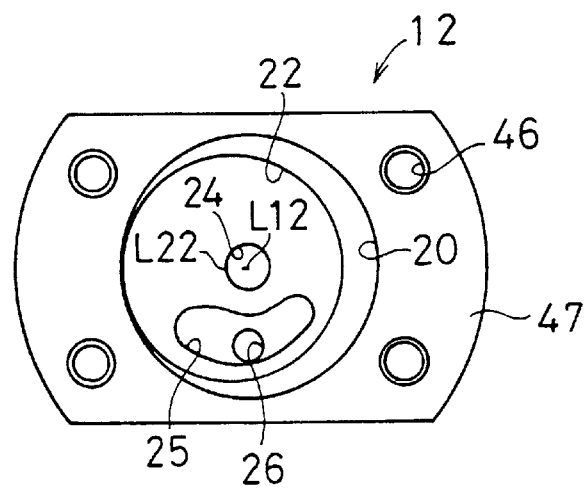
FIG. 9 is a left side view of the pump chamber forming member 12 of FIG. 7.
Figure 10:
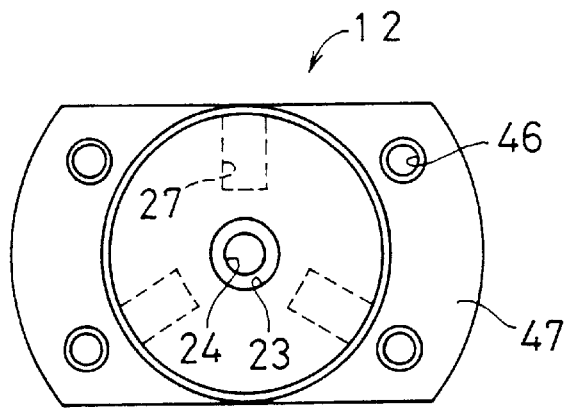
FIG. 10 is a right side view of the pump chamber forming member 12 of FIG. 7.
Figure 11:
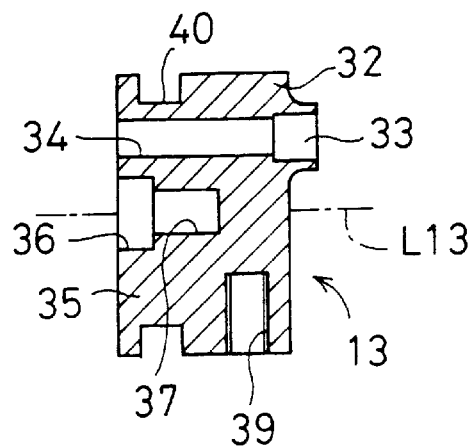
FIG. 11 is a cross sectional view of a suction port forming member 13 constituting the housing 3.
Figure 12:
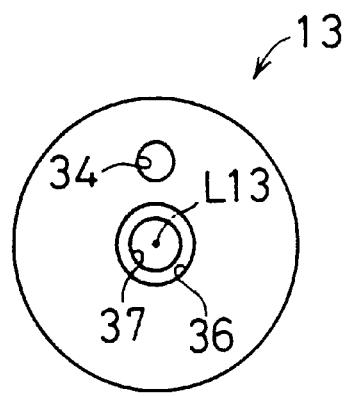
FIG. 12 is a left side view of the suction port forming member 13 of FIG. 11.
Figure 13:
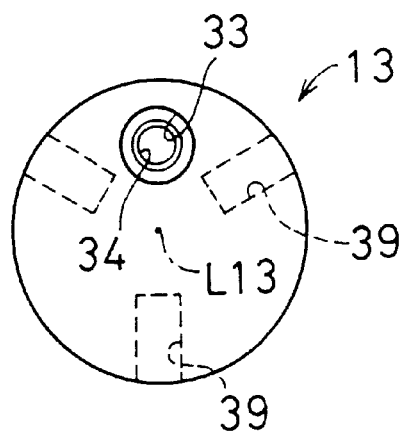
FIG. 13 is a right side view of the suction port forming member 13 of FIG. 11.
Figure 14:
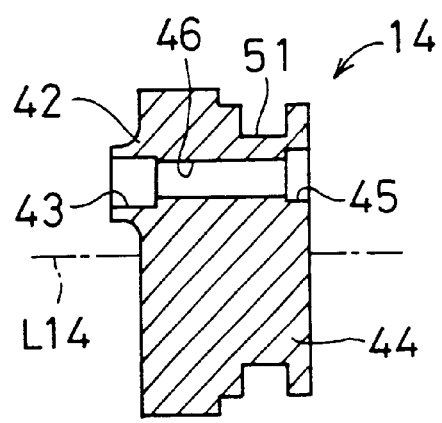
FIG. 14 is a cross sectional view showing a discharge port forming member 14 constituting the housing 3.
Figure 15:
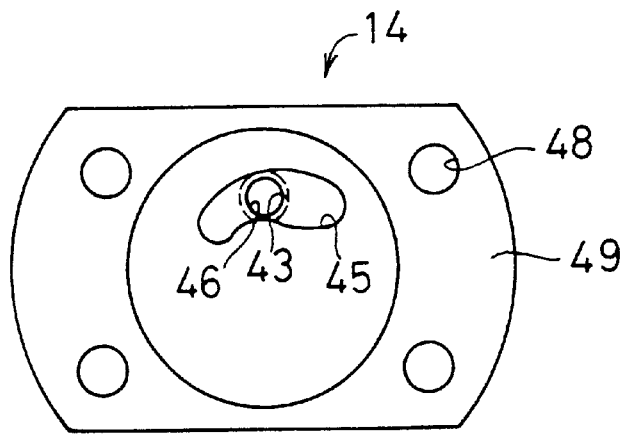
FIG. 15 is a right side view of the discharge port forming member 14 of FIG. 14.

Assembled to the housing 3 are a cylindrical-shaped member 11 shown in FIGS. 5 and 6, a pump chamber forming member 12 shown in FIGS. 7, 8, 9 and 10, a suction port forming member 13 shown in FIGS. 11, 12 and 13, and a discharge port forming member 14 shown in FIGS. 14 and 15. The cylindrical-shaped member 11 is thin-walled and cylindrical-shaped, and both axial ends 15 and 16 thereof are formed with a plurality of, for example, circumferentially three, through holes 17, 18, respectively.

The pump chamber forming member 12 is formed at its one axial end 19 with an axially opened fitting recess 20, in which a pump chamber 22 having a cylindrical-shaped, inner peripheral surface is formed to be contiguous to the other axial end of the fitting recess 20. The fitting recess 20 is coaxial with an axis L12 of the pump chamber forming member 12, and the pump chamber 22 is of a smaller diameter than that of the fitting recess 20 to be formed offset from the axis L12 of the pump chamber forming member 12.

Also, the pump chamber forming member 12 is formed at the other axial end 21 with an axially opened bearing recess 23, which is coaxial with the axis L12 of the pump chamber forming member 12, and with a shaft insertion hole 24, which passes through the pump chamber forming member 12 along the axis L12 to provide communication between the pump chamber 22 and the bearing recess 23. Further, the pump chamber forming member 12 is formed with an inside pump port 25, which is contiguous to the pump chamber 22 on a side of the other axial end 21, and an inside pump passage 26, which is offset from the axis L12 of the pump chamber forming member 12 to pass in parallel to the axis L12. The inside pump port 25 is formed in an arc extending about an axis of the pump chamber 22, that is, an axis L22 of an inner peripheral surface facing the pump chamber 22, the inside pump passage 26 being axially opened at the other axial end 21 of the pump chamber forming member 12.

Such pump chamber forming member 12 is inserted into the cylindrical-shaped member 11 from a side of the other axial end 21, and mounted to the one axial end 15 of the cylindrical-shaped member 11 by inserting bolts 28 through the respective through holes 17 and screwing the same to the pump chamber forming member 12 with the use of threaded holes 27. In this state, an O-ring 31 is provided between the cylindrical-shaped member 11 and the pump chamber forming member 12 to be fitted into an annular groove 30, which is formed in an outer peripheral portion at the other axial end 21 of the pump chamber forming member 12, thus attaining sealing.

Formed in the suction port forming member 13 are an axially opened suction port 33, which is disposed at a one axial end 32 to be offset from an axis L13 of the suction port forming member 13, and a suction passage 34 contiguous to the suction port 33 to extend axially in parallel to the axis L13 of the suction port forming member 13, the suction passage 34 being axially opened at the other axial end 35 of the suction port forming member 13. Also, formed in the suction port forming member 13 are an axially opened bearing recess 36, which is disposed at the other axial end 35 to be coaxial with the axis L13 of the suction port forming member 13, and a shaft insertion recess 37 contiguous to the bearing recess 36 to extend near a center in the axial direction along the axis L13 of the suction port forming member 13.

Such suction port forming member 13 is inserted into the cylindrical-shaped member 11 from a side of the other axial end 35, and mounted to the other axial end 16 of the cylindrical-shaped member 11 by inserting bolts 38 through the respective through holes 18 and screwing the same to the suction port forming member 13 with the use of threaded holes 39. In this state, an O-ring 41 is provided between the cylindrical-shaped member 11 and the suction port forming member 13 to be fitted into an annular groove 40, which is formed in an outer peripheral portion at the other axial end 35 of the suction port forming member 13, thus attaining sealing.

Formed in the discharge port forming member 14 is an axially opened discharge port 43, which is disposed at the one axial end 42 thereof to be offset from an axis L14 of the discharge port forming member 14. Further, formed in the discharge port forming member 14 is an outside pump port 45, which is disposed at the other axial end 44 thereof to be offset from the axis L14 of the discharge port forming member 14. The outside pump port 45 is disposed in a position corresponding to the discharge port 43 with respect to in a circumferential direction to extend circumferentially arcuately. Further, formed in the discharge port forming member 14 is a discharge passage 46, which is offset from the axis L14 of the discharge port forming member 14 to extend through the discharge port forming member 14 in parallel to the axis L14.

Such discharge port forming member 14 has the other axial end 44 fitted into the fitting recess 20 of the pump chamber forming member 12 to plug the pump chamber 22 in the axial direction. The pump chamber forming member 12 is provided at its one axial end 19 with a flange 47, which extends radially outward and is formed with a plurality of (for example, four) threaded holes 46, and the discharge port forming member 14 is provided at its one axial end 42 with a flange 49, which extends radially outward and is formed with a plurality of (for example, four) through holes 48. Bolts 50 inserted through the respective through holes 48 are screwed into the flange 47 with the use of the threaded holes 46, whereby the discharge port forming member 14 is mounted to the pump chamber forming member 12 with its other axial end 44 fitted into the fitting recess 20. In this state, an O-ring 52 is provided between the pump chamber forming member 12 and the discharge port forming member 14 to be fitted into an annular groove 51, which is formed in an outer peripheral portion at the other axial end 44 of the discharge port forming member 14, thus attaining sealing.

In this manner, the housing 3 is constructed, in which state the axis L11 of the cylindrical-shaped member 11, the axis L12 of the pump chamber forming member 12, the axis L13 of the suction port forming member 13, and the axis L14 of the discharge port forming member 14 are in accord with the axis L3 of the housing 3. A rotor chamber 55 is formed in the housing 3 to be disposed between the pump chamber forming member 12 and the suction port forming member 13, and the suction passage 34 and the inside pump passage 26 are communicated to the rotor chamber 55. Accordingly, the suction port 33 and the discharge port 43 are formed in the housing 3, and the flow passage 2 is formed to communicate with these ports 33, 43. The flow passage 2 of a fluid refrigerant is formed by connection of at least the suction passage 34, the rotor chamber 55, the inside pump passage 26, the inside pump port 25, the pump chamber 22, the outside pump port 45 and the discharge passage 46 in this order. Such housing 3 is composed of, for example, stainless steel.

Figure 16:
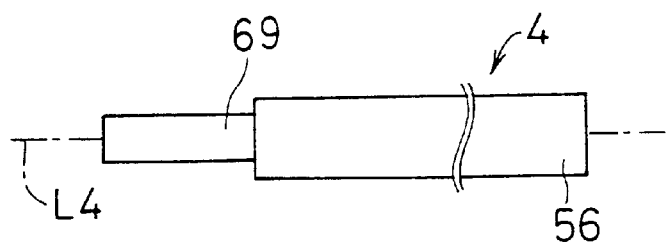
FIG. 16 is a front view showing a rotating shaft 4.
Figure 17:
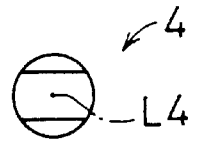
FIG. 17 is a left side view of the rotating shaft 4 of FIG. 16.
Figure 18:
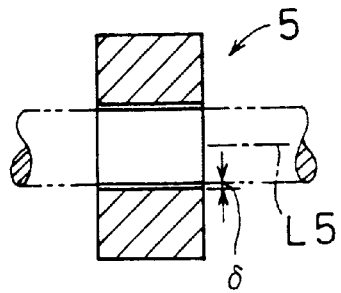
FIG. 18 is a cross sectional view showing slide bearing members 5.
Figure 19:
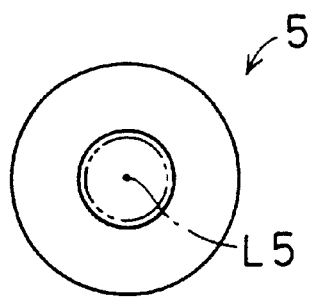
FIG. 19 is a left side view of the slide bearing members 5 of FIG. 18.

Provided within such housing 3 is the rotating shaft 4 being a movable member shown in FIGS. 16 and 17, the rotating shaft 4 being rotatably supported by the slide bearing members 5, which are support members shown in FIGS. 18 and 19. The rotating shaft 4 is formed of stainless steel to be columnar-shaped, and its one axial end 69 is partially cut away in a circumferential direction to be oval-shaped in cross section to be adapted for latching. In this embodiment, two slide bearing members 5 are provided, each of which is formed of amorphous carbon to be made in the form of a short cylinder.

The respective slide bearing members 5 are press fitted into and fixed to the bearing recess 23 of the pump chamber forming member 12 and the bearing recess 36 of the suction port forming member 13 in such a way that the axis L5 is in accord with the axis L3 of the housing 3. In this manner, the respective slide bearing members 5 are held by and provided in the housing 3 to be exposed to the rotor chamber 55, which constitutes a part of the flow passage 2. In a state of being inserted through the respective slide bearing members 5, the rotating shaft 4 is inserted through the shaft insertion hole 24 of the pump chamber forming member 12 with one axial end thereof disposed in the pump chamber 22 and the other axial end thereof 56 inserted and disposed in the shaft insertion recess 37.

In this manner, the rotating shaft 4 is rotatably supported about the axis L3 from radially outward by the slide bearing members 5 with the axis L4 in accord with the axis L3 of the housing 3. Thus the respective slide bearing members 5 are radial bearings for supporting the rotating shaft 4 in a radial direction. When the rotating shaft 4 has an outer diameter of, for example, 2 mm, a radial gap d between the rotating shaft 4 and the respective slide bearing members 5 is at least 0.75 mm and at most 2 mm with an inner diameter of the slide bearing members 5 being selected to be at most 2.015 mm and at least 2.004 mm. Such gap is dimensioned to allow a refrigerant in the rotor chamber 55 to enter thereinto due to the capillary phenomenon. Thus the gap is formed to be extremely small, thus enabling stably stable support of the rotating shaft 4.

Figure 20:
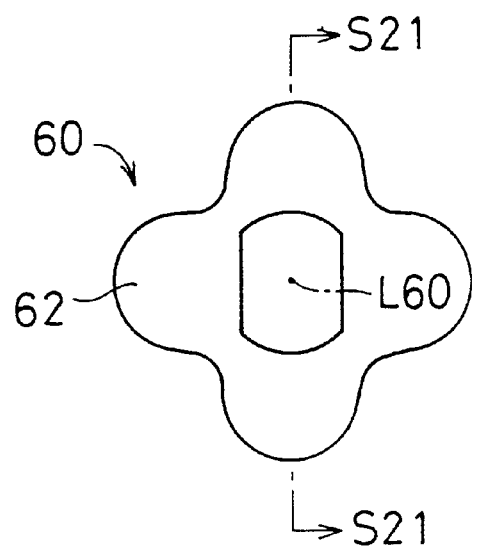
FIG. 20 is a front view showing an inner gear 60.
Figure 21:
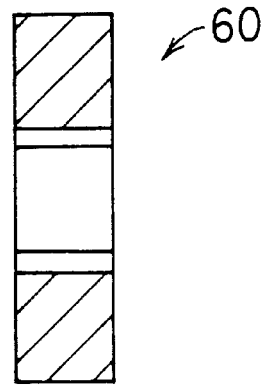
FIG. 21 is a cross sectional view taken along cutting plane line S21—S21 in FIG. 20.
Figure 22:
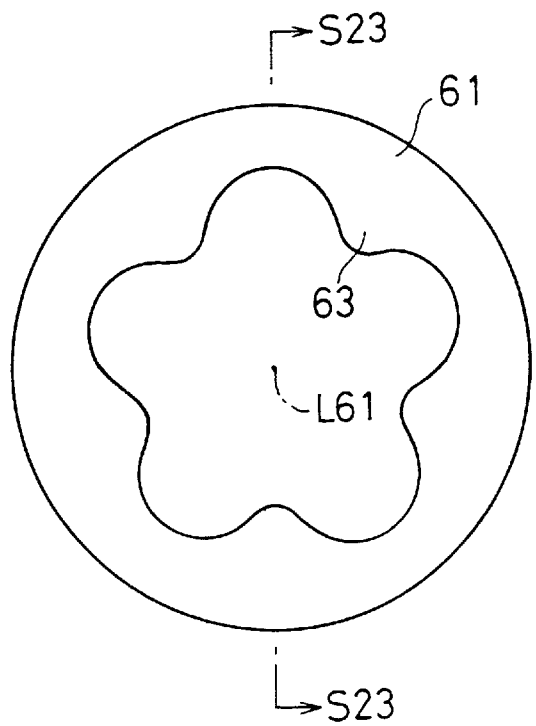
FIG. 22 is a front view showing an outer gear 61.
Figure 23:
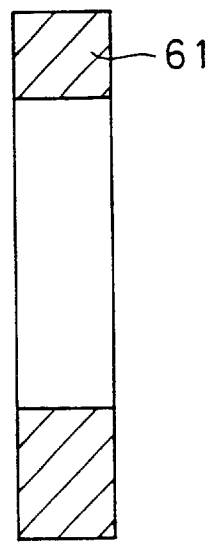
FIG. 23 is a cross sectional view taken along cutting plane line S23—S23 in FIG. 22.
Figure 24:
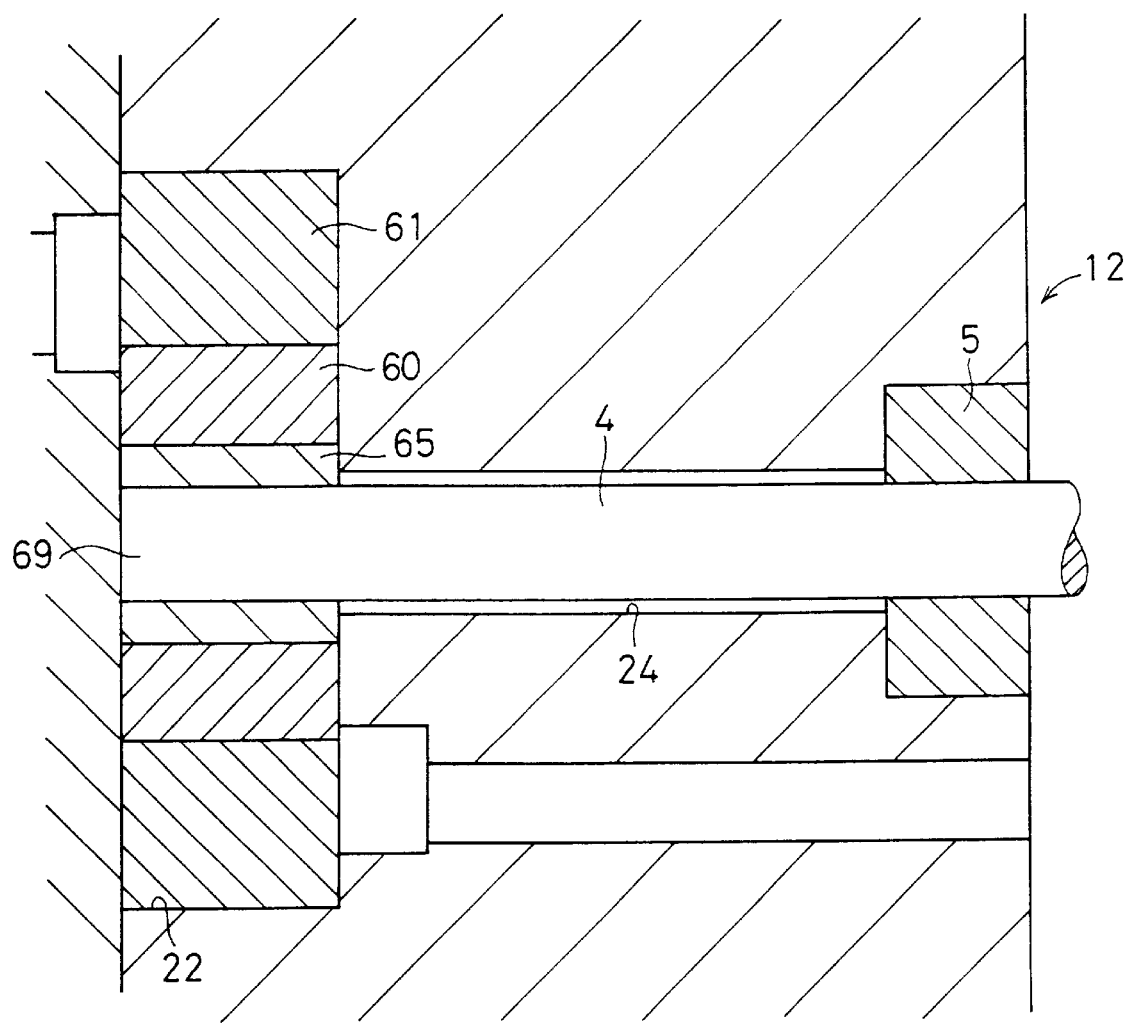
FIG. 24 is a cross sectional view showing a pump body 10 on an enlarged scale.
Figure 25:
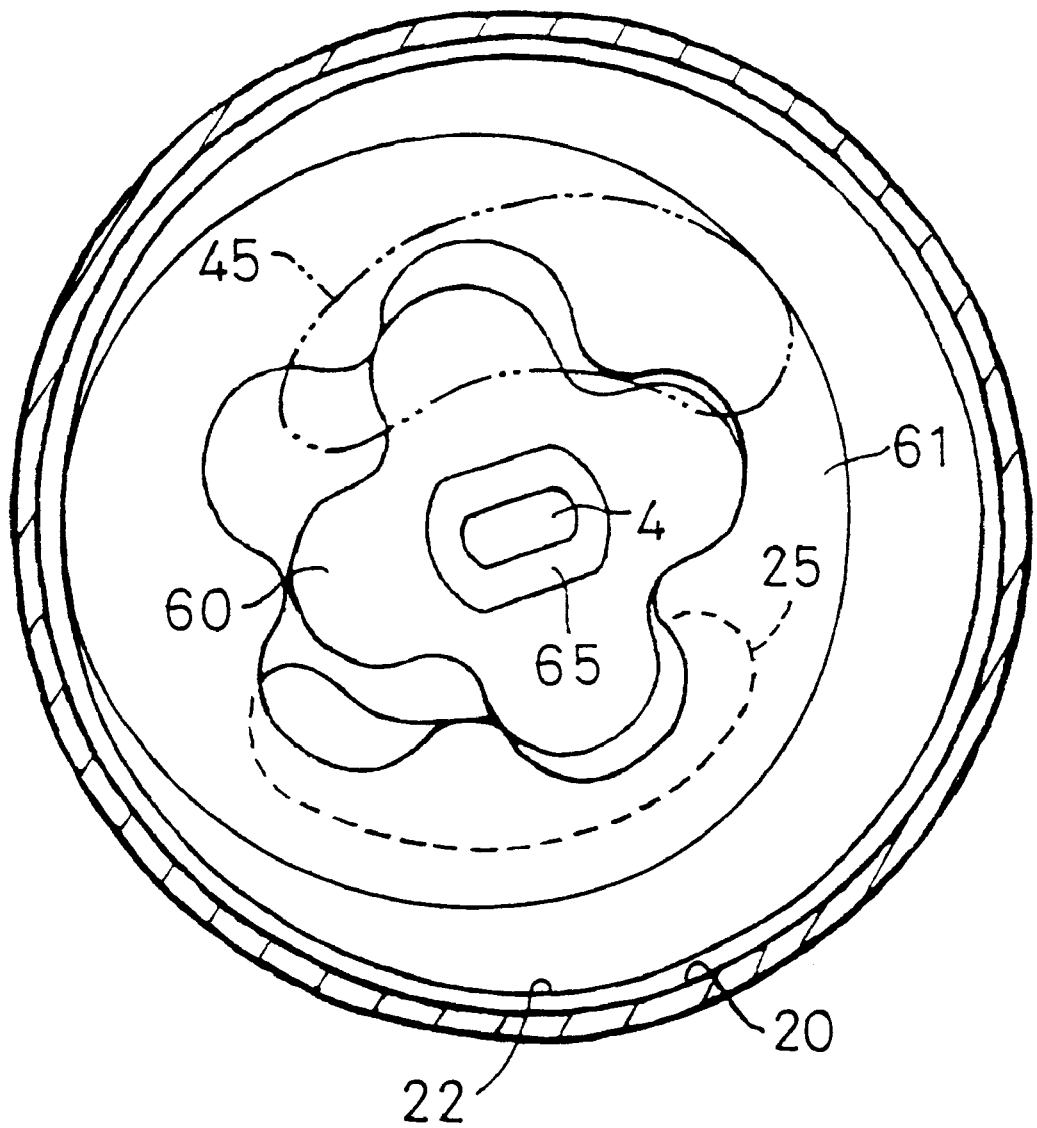
FIG. 25 is a cross sectional view of the pump body 10 as viewed from leftward of FIG. 24.

Fitted in the pump chamber 22 as shown in FIGS. 24 and 25 are an inner gear 60 shown in FIGS. 20 and 21, and an outer gear 61 shown in FIGS. 22 and 23. The inner gear 60 is formed at an outer periphery thereof with a plurality of (for example, four) teeth 62. The outer gear 61 is substantially cylindrical-shaped and formed at an inner periphery thereof with teeth 63, the number of which is more by one than that of the teeth 62 of the inner gear 60.

Figure 26:
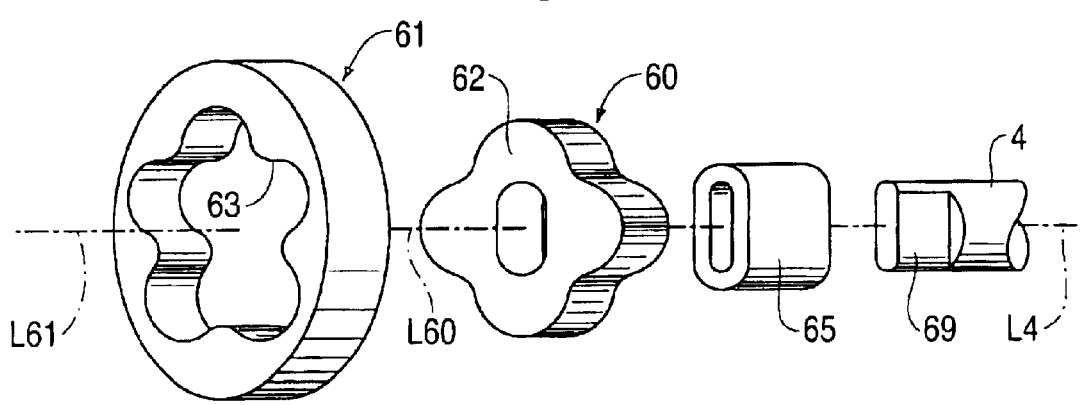
FIG. 26 is an exploded, perspective view showing the pump body 10.

As shown in FIG. 26, the inner gear 60 is fixed to one end 69 of the rotating shaft 4 in a state in which a spacer 65 in the form of a substantially elliptical cylinder is press fitted onto one end 55 of the rotating shaft 4 and the inner gear is press fitted onto the spacer 65. Accordingly, the inner gear 60 has its axis L60 aligned with the axis L3 of the housing 3. The outer gear 61 is fitted onto the inner gear 60 in a state of meshing with the inner gear 60. The outer gear 61 has an outer diameter slightly smaller than an inner periphery of the pump chamber 22 and has its axis L61 aligned with the axis L22 of the pump chamber 22 to be eccentric relative to the inner gear 60.

These inner gear 60, outer gear 61 and a portion surrounding the pump chamber 22 constitute a displacement pump, concretely a pump body 10 being a trochoidal gear pump. With the pump body 10, a plurality of pressure chambers are defined between the inner gear 60 and the outer gear 61, so that when the inner gear 60 is rotated by rotation of the rotating shaft 4, the outer gear 61 correspondingly rotates to vary volumes of the pressure chambers. The pressure chambers are communicated to the inside pump port 25 in a position where volumes become large, and are made contiguous to the outside pump port 45 in a position where volumes become small.

Also, the inner gear 60 and the outer gear 61 are formed of amorphous carbon. The inner gear 60 also functions as a thrust bearing for axially supporting the rotating shaft 4.

The rotor 7 fixed to the rotating shaft 4 and formed of a magnet is provided in the rotor chamber 55, and the stator 8 is provided in a position surrounding the rotor 7 outside the housing 3. Drive means 9 is constituted by the rotor and the stator. The stator 8 includes a coil, which is electrically energized to impart torque to the rotor 7 due to the magnetic action between it and the rotor 7, thus rotatingly driving the rotating shaft 4 to rotate the inner gear 60 to drive the pump body 10. Thereby, the pump body 10 causes a refrigerant to be sucked from the suction port 33 to flow down the flow passage 2 to be discharged from the discharge port 43.

Figure 27:
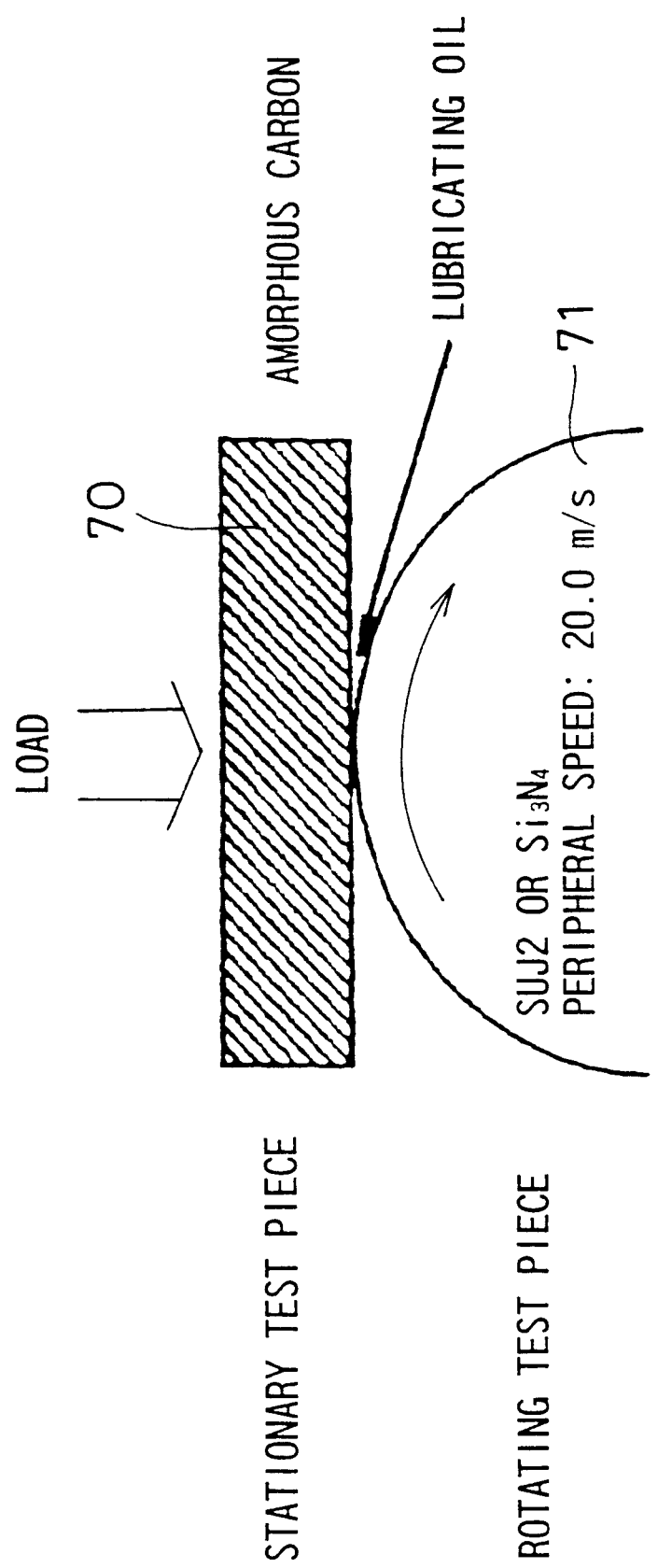
FIG. 27 is a cross sectional view showing an apparatus for measuring coefficients of friction.
Figure 28B:
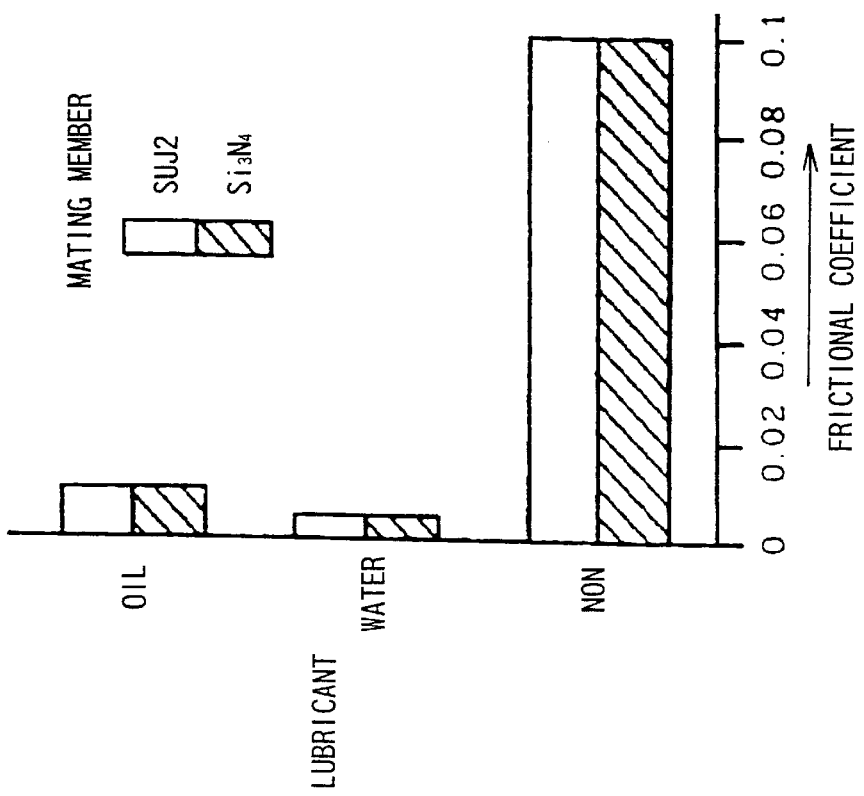
FIGS. 28A and 28B are graphs showing results of tests for measuring coefficients of friction.
Figure 28A:
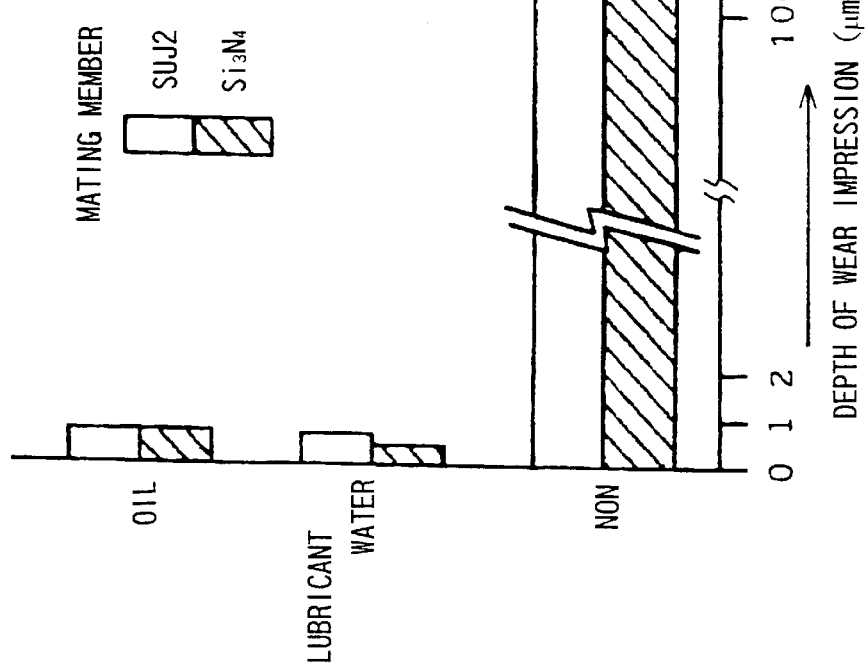

Amorphous carbon (referred below to as "AC") is also called glass carbon, and is amorphous carbon to have a property of a low coefficient of friction. FIGS. 28A and 28B show results of a test in which a coefficient of friction was measured by sliding, for example a stationary test piece 70 formed of AC shown in FIG. 27, on an outer periphery of a rotating test piece formed of high carbon chromium bearing steel (SUJ2) or silicon nitride ($Si_3N_4$). In this manner, members formed of AC exhibit small coefficients of friction even when no lubricant exists between them and other members, and further exhibit extremely small coefficients of friction when a lubricant is present, irrespective of the kind of lubricant.

Figure 29:
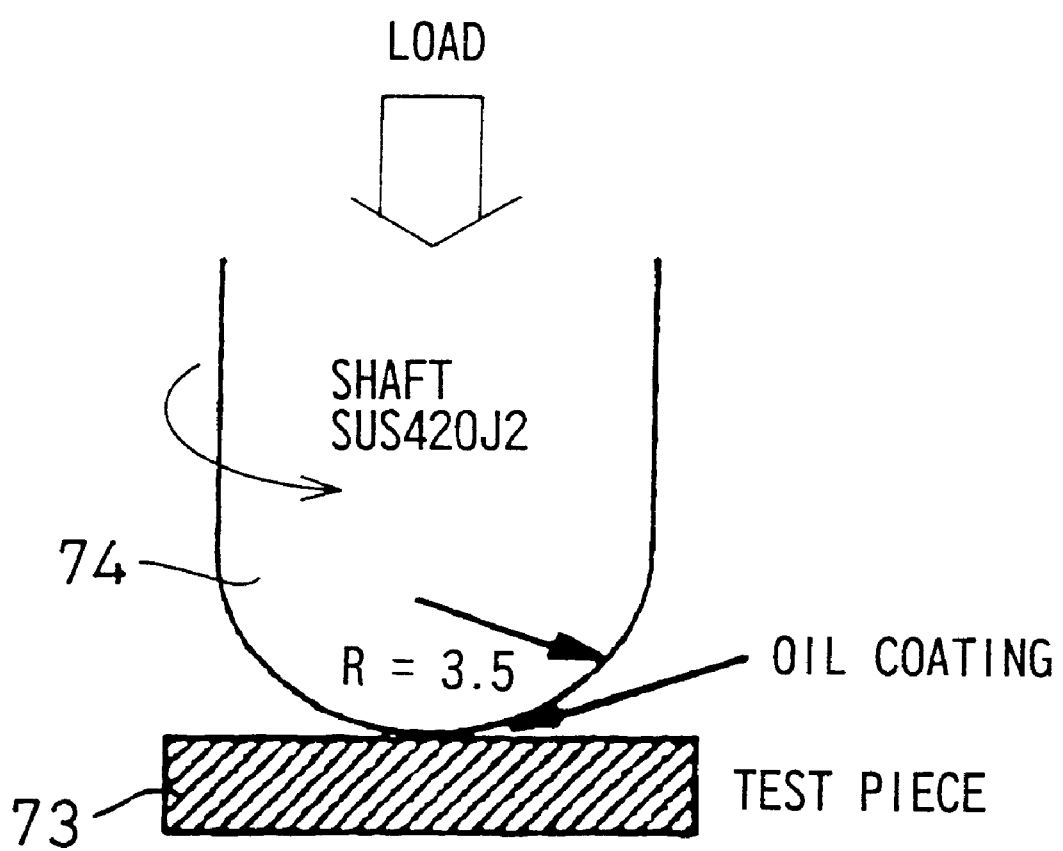
FIG. 29 is a cross sectional view showing an apparatus for measuring wear in the air.
Figure 30B:
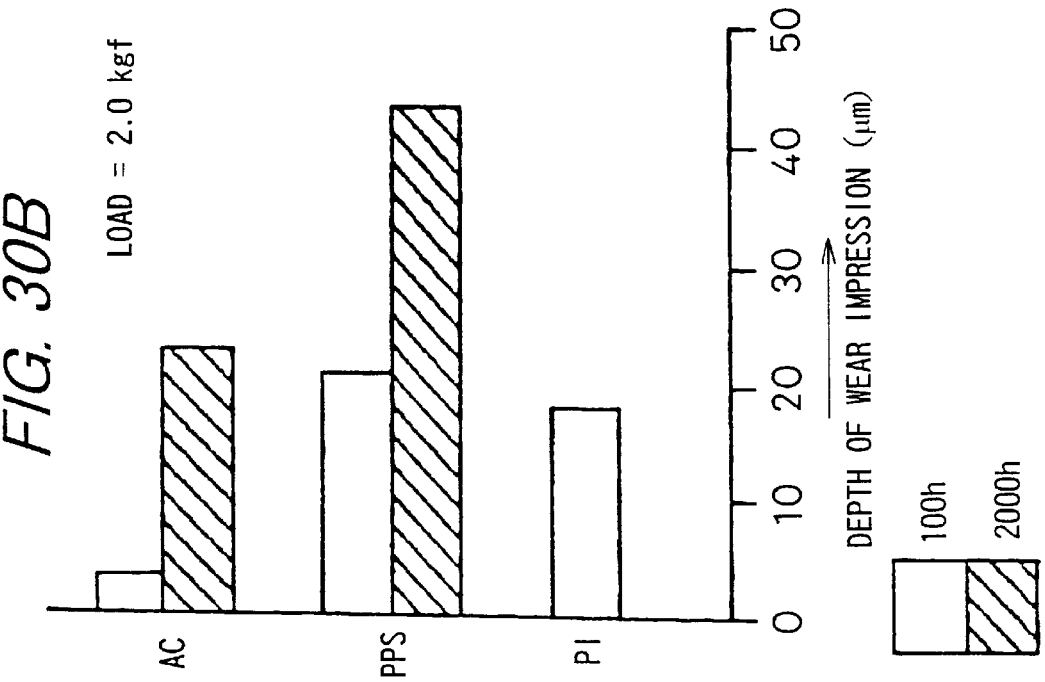
FIGS. 30A and 30B are graphs showing results of tests for measuring wear in the air.
Figure 30A:
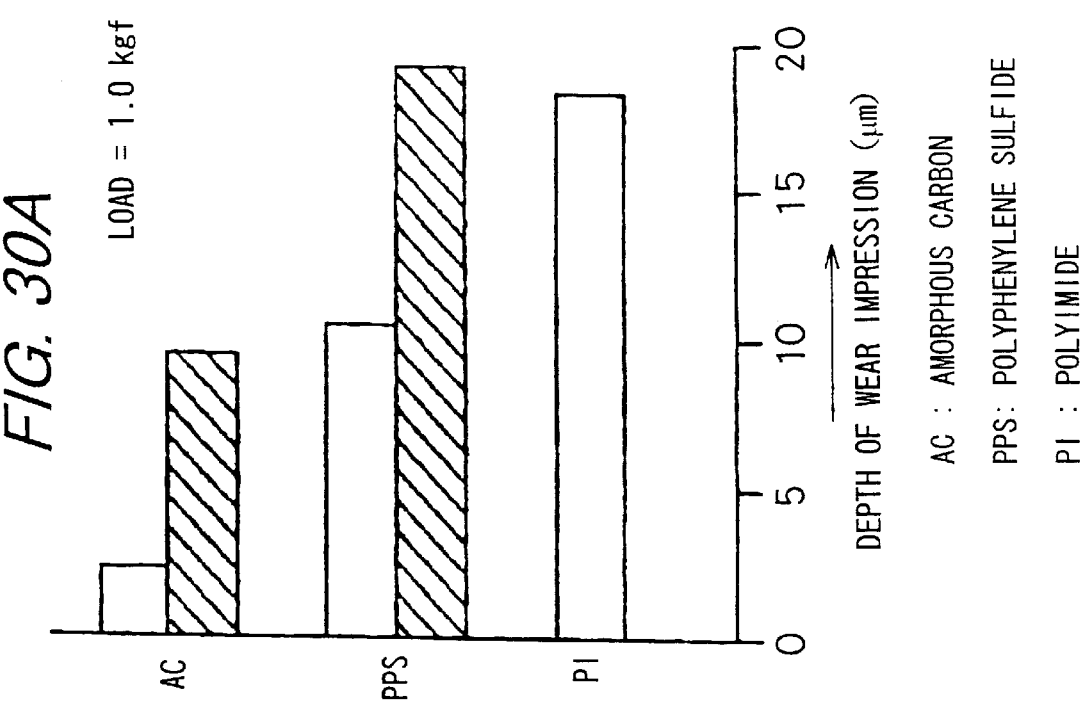
Figure 31:
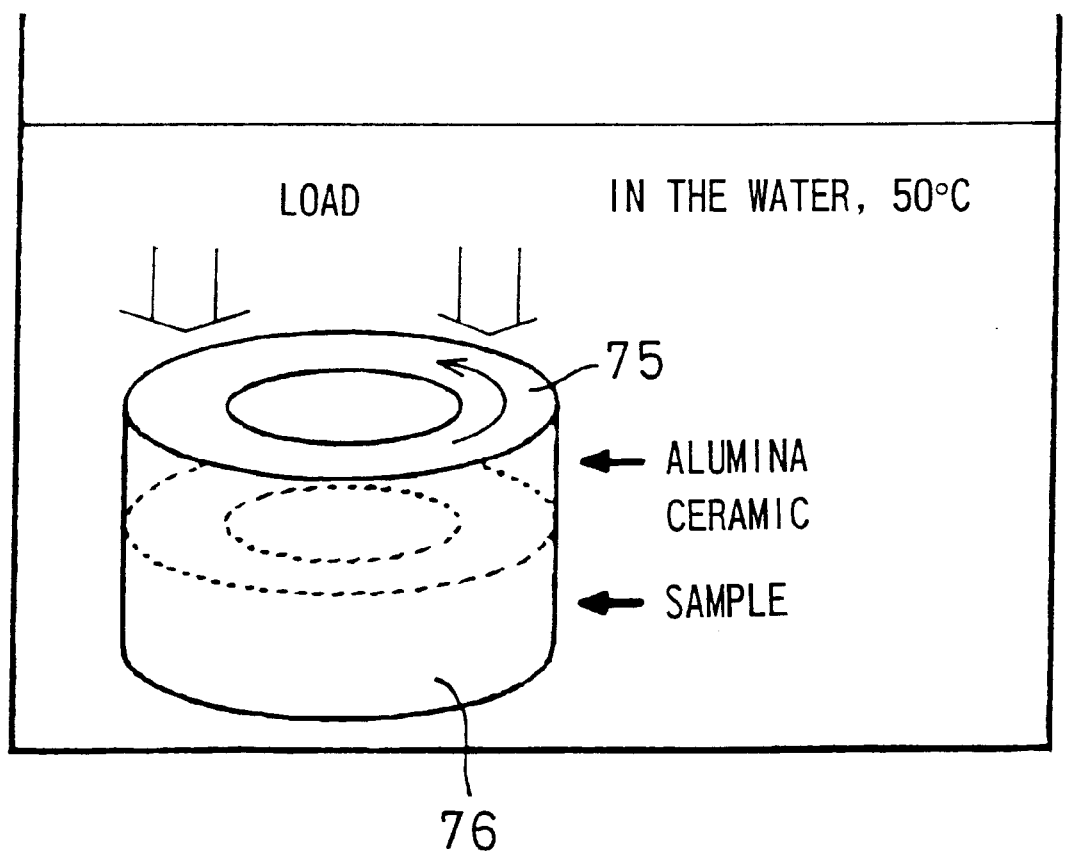
FIG. 31 is a cross sectional view showing an apparatus for measuring wear in the water.
Figure 32A:
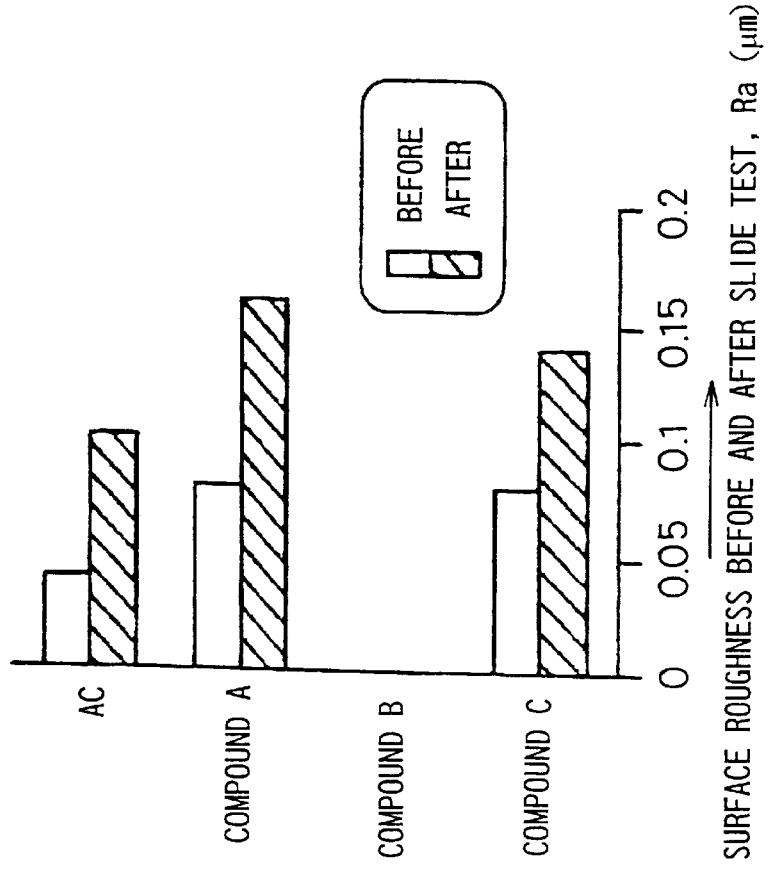
FIGS. 32A and 32B are graphs showing results of tests for measuring wear in the water.
Figure 32B:
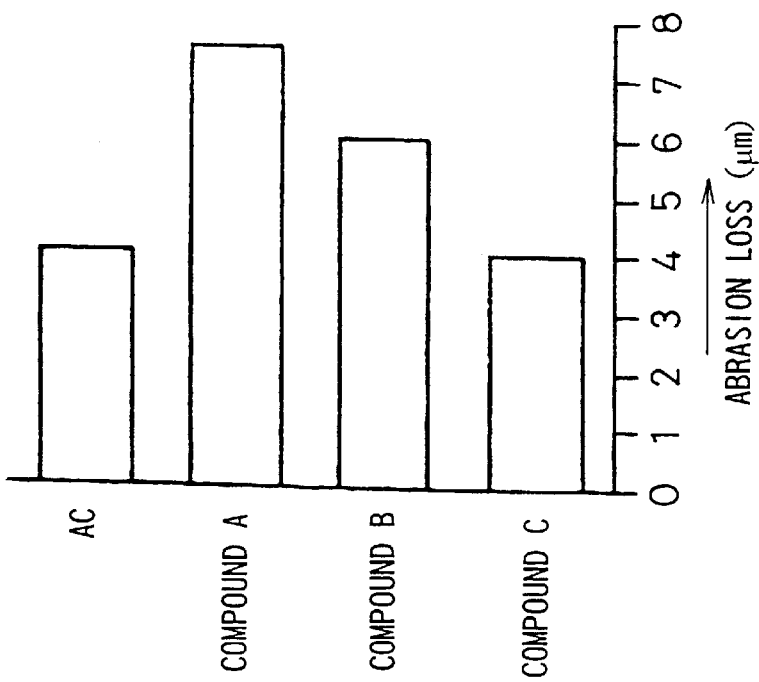
Figure 33:
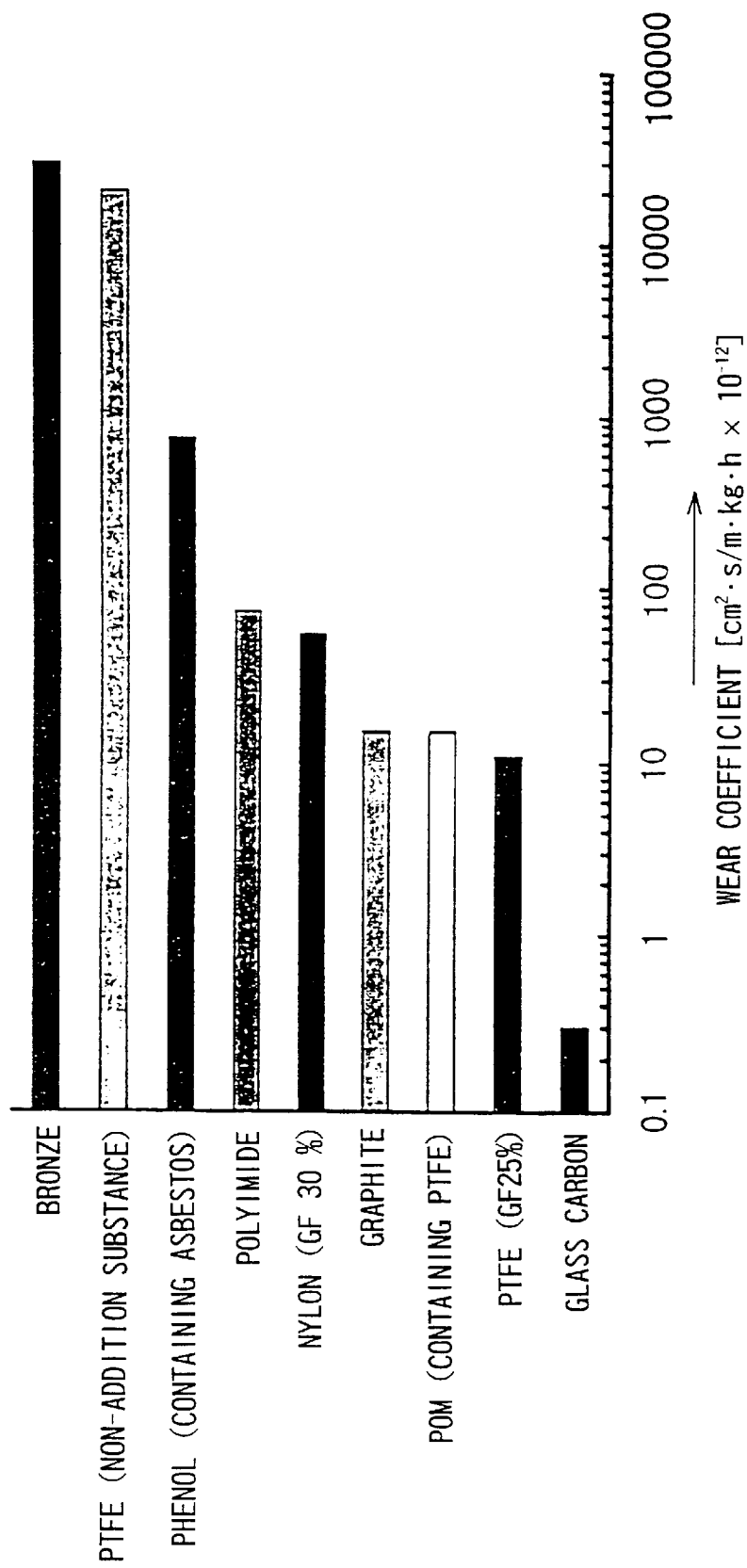
FIG. 33 is a graph showing wear coefficients of various materials including AC.

Also, members formed of AC have a property in that the coefficients of friction are small. FIGS. 30A and 30B show results of a test in which depth of severe-mild wear was measured by rotating, pushing and sliding a test shaft 74, which was formed of stainless steel and had a semi-spherical shaped tip end, on, for example, a stationary test piece 73 formed of AC and shown in FIG. 29. Also, FIGS. 32A and 32B show results of a test, in which severe-mild wear and surface roughness were measured by rotating, pushing and sliding a test piece 75, which was formed of alumina ceramics, on a test piece composed of AC or several compounds in water as shown in FIG. 31. As indicated by these test results and a graph in FIG. 33, members formed of AC are small in coefficient of friction as compared with other members formed of other materials, and so hard to abrade, and are small in surface roughness even in the case of wearing.

Figure 34:
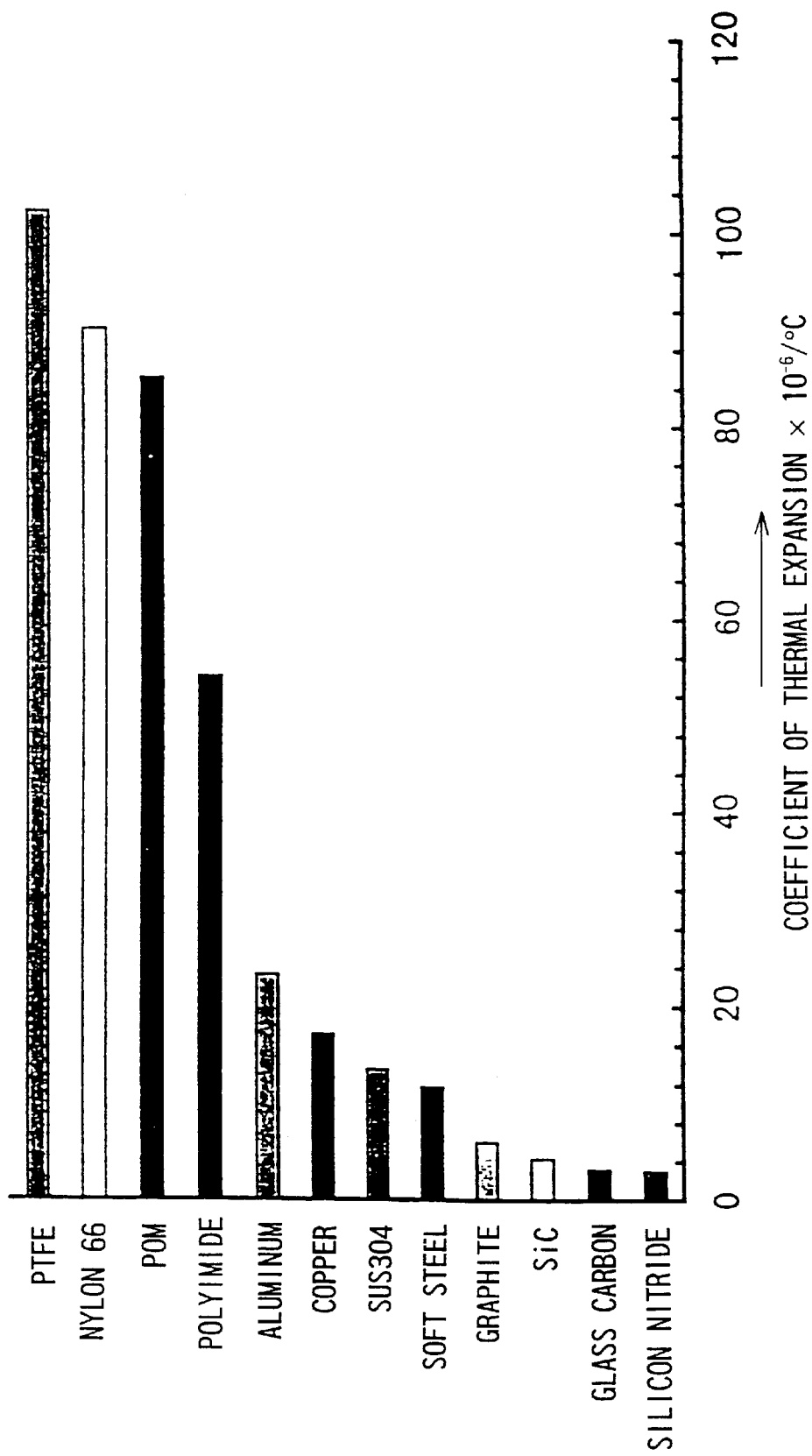
FIG. 34 is a graph showing coefficients of thermal expansion of various materials including AC.
Figure 35:
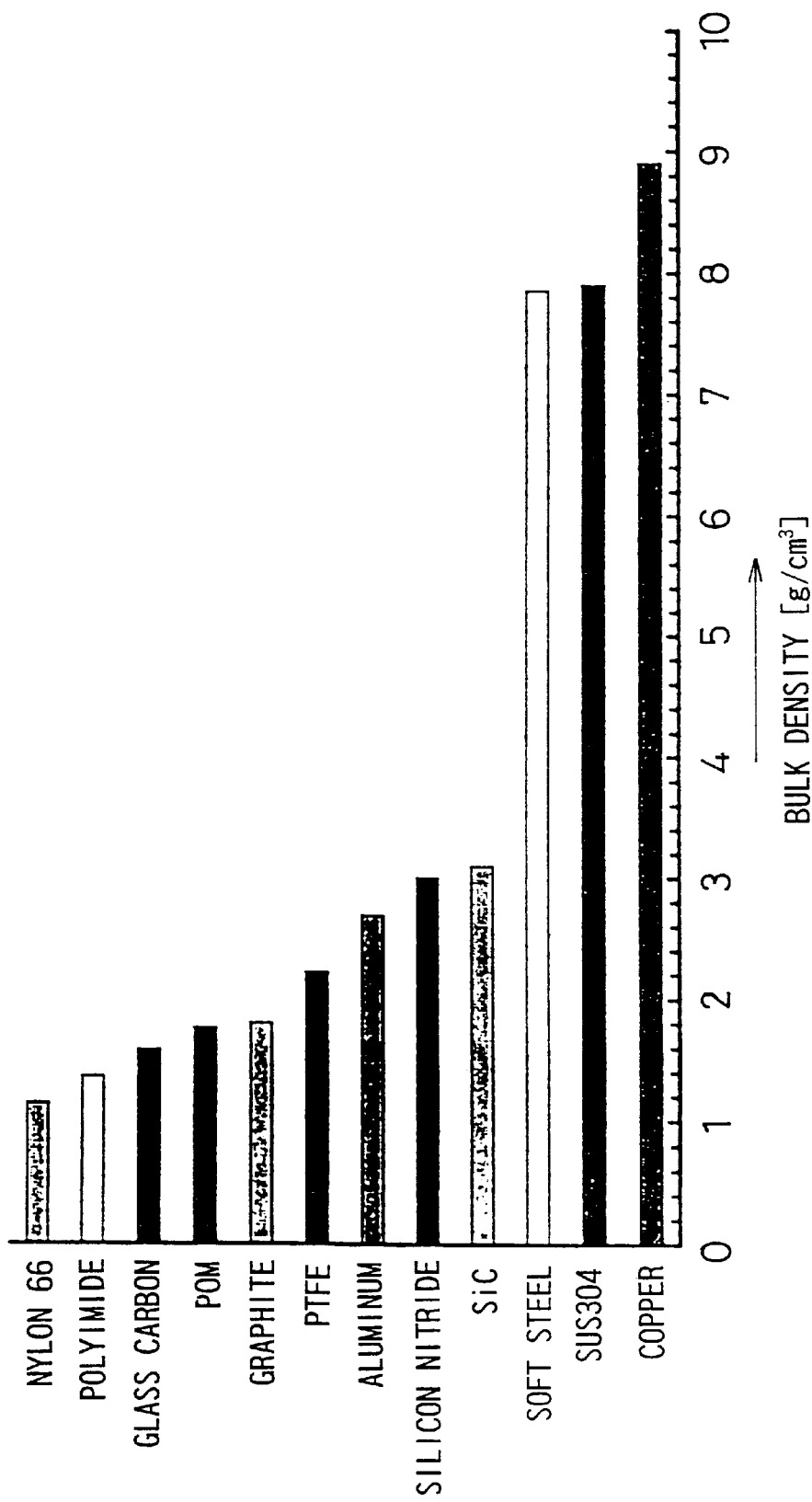
FIG. 35 is a graph showing bulk densities of various materials including AC.
Figure 36:
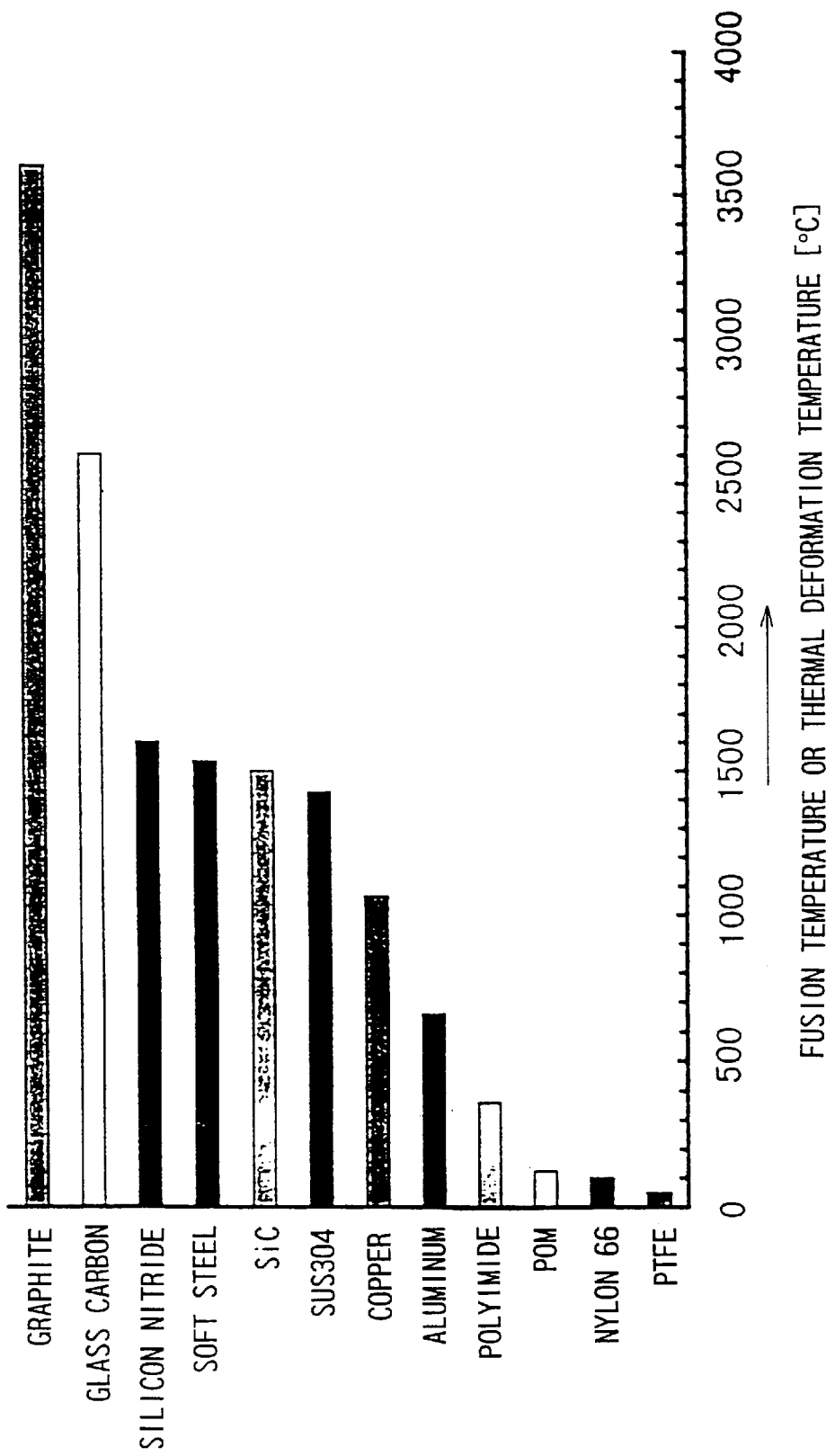
FIG. 36 is a graph showing melting points or temperatures of thermal deformation of various materials including AC.

Further, members formed of AC are small in coefficient of thermal expansion as shown in FIG. 34, small in bulk density as shown in FIG. 35, and high in melting point or temperature thermal deformation to be high in heat resistance as shown FIG. 36.

Also, Table 1 shows properties of AC and other materials in combination, Table 2 showing properties of AC, Table 3 showing contents of impurities in the slide bearing members 5 formed of AC, inner gear 60 and the outer gear 61, and Table 4 showing hydrofluoric acid resistance of the slide bearing members 5 formed of AC, inner gear 60 and the outer gear 61.

TABLE 1

| material | structure | bonding strength | fusing point or Tg (K) | strength (MPa) | Young's modulus (GPa) | ductility (breaking strain) (%) | coefficient of thermal expansion $\times 10^{-6}$/° C. | density (Mg/m$^3$) |
|---|---|---|---|---|---|---|---|---|
| ceramics | aggregation of compound-based crystal | ionic bond and covalent bond | high 800–3500 | large 1000–20000 | large 70–700 | small $10^0$ | small 0–10 | small to medium 1–5 |
| metal | crystal of simple substance or solid solution | metallic bond | medium 400–3400 | medium 400–3000 | medium 70–400 | medium $10^0$–$10^2$ | medium 4–40 | medium to large 2–20 |
| organic polymer | amorphous substance composed of molecular chain | covalent bond | low 350–600 | small 10–100 | small 10 or less | medium $10^0$–$10^3$ | large $10^2$ or more | small 1–2 |
| amorphous carbon | simple, amorphous substance | covalent bond | 2600 | 200 | 30 | 1 | 3 | 1.5 |
| isotropic high-density graphite | crystal aggregation of simple substance | covalent bond | 3600 | 40–90 | 10–15 | $10^0$ | 4.6–6.5 | 1.7–1.9 |

TABLE 2

| | | | | | | | | | Coefficient | heat | | Charpy | ash |
|---|---|---|---|---|---|---|---|---|---|---|---|---|---|
| bulk density g/cm³ | porosity % | gas transmittance cm²/sec | bending strength MPa | tensil strength MPa | tensil elongation % | elastic modulus GPa | Resistibility μΩ·cm | | of thermal expansion ×10⁻⁶/K | conductivity W/m·K | Shore hardness | impact strength kg·cm/cm² | content ppm |
| 1.46–1.60 | 0.6–0.9 | 2.4 × 10⁻¹² | 120 | (40) | (1.1) | 30 | 4400–4500 | | 3.0 | 5–8 | 127–130 | (2.1–3.6) | 20 |

* properties

TABLE 3

* analytical value of ash content (impurities)

impurities

| | Al | Ca | Cr | Ba | Fe | Co | Mn | Sr | Ni | V | Si | total ash content |
|---|---|---|---|---|---|---|---|---|---|---|---|---|
| concentration (ppm) | ND | 1.5 | <0.1 | <0.1 | 2.5 | 0.1 | ND | <0.1 | 1.4 | <0.1 | 2.7 | 20 |

TABLE 4 hydrofluoric acid resistance impurities

| | Al | Ca | Cr | Cu | Fe | K | Mg | Na | Ni | Pb | Si |
|---|---|---|---|---|---|---|---|---|---|---|---|
| concentration (ppm) | 0.14 | <1 | <0.1 | <0.2 | <0.5 | <1 | <0.05 | 0.3 | <0.05 | <0.2 | <1000 |

As apparent from the above-mentioned respective test results and the respective Tables 1 to 4, AC possesses properties such as lightness, low coefficient of thermal expansion, high rigidity, high heat resistance, gas non-permeability, high hardness, abrasion resistance, low coefficient of friction, compact homogeneous structure, chemical resistance and carbon powder non-falling or the like, and is much suitable as a material for members, which slide relative to other members. That is, AC can be much suitably used as the above-mentioned slide bearing member.

Figure 37:
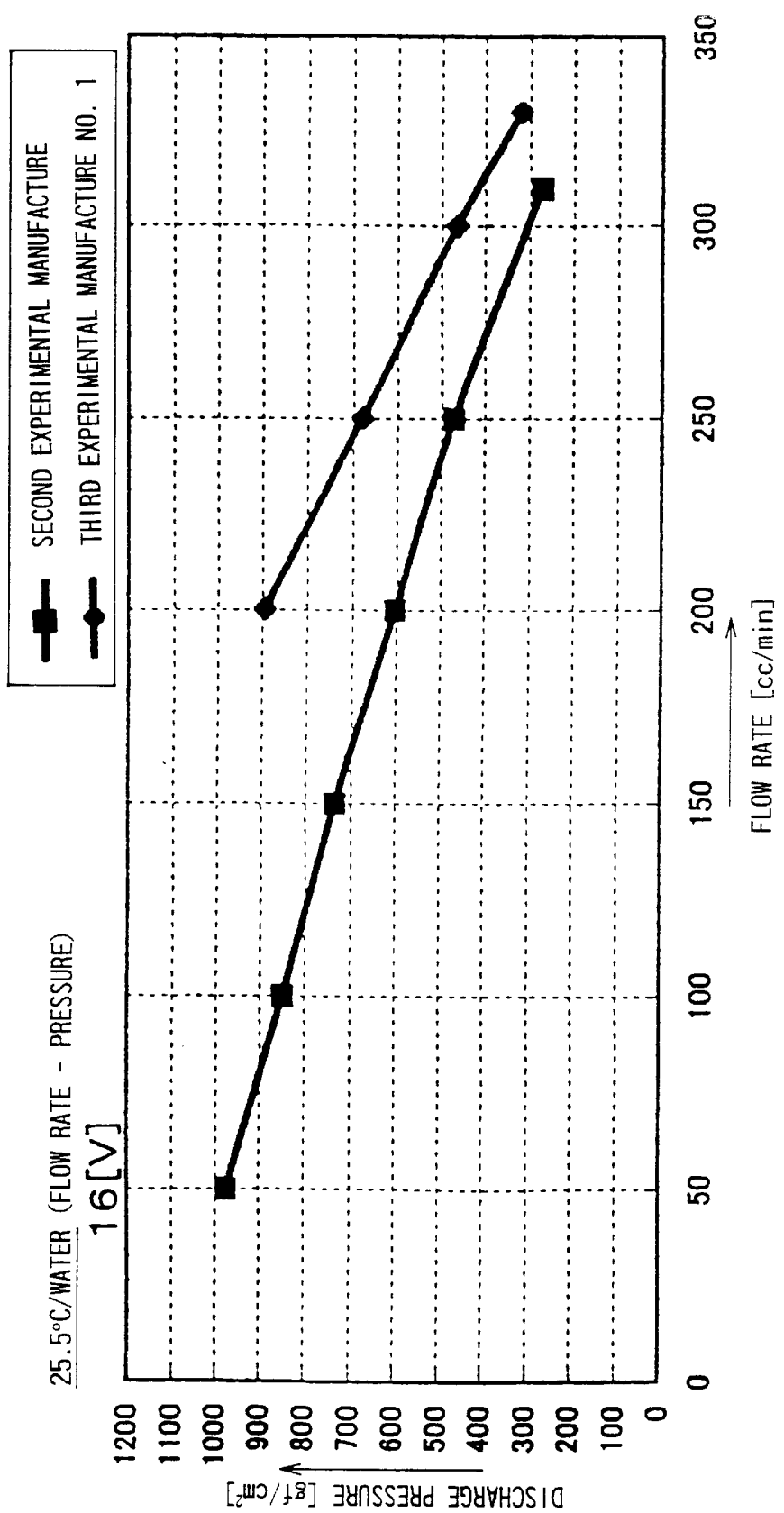
FIG. 37 is a graph showing the relationship between discharge pressure and flow rate of the pump apparatus 1 making use of water at 5.5° C.
Figure 38:
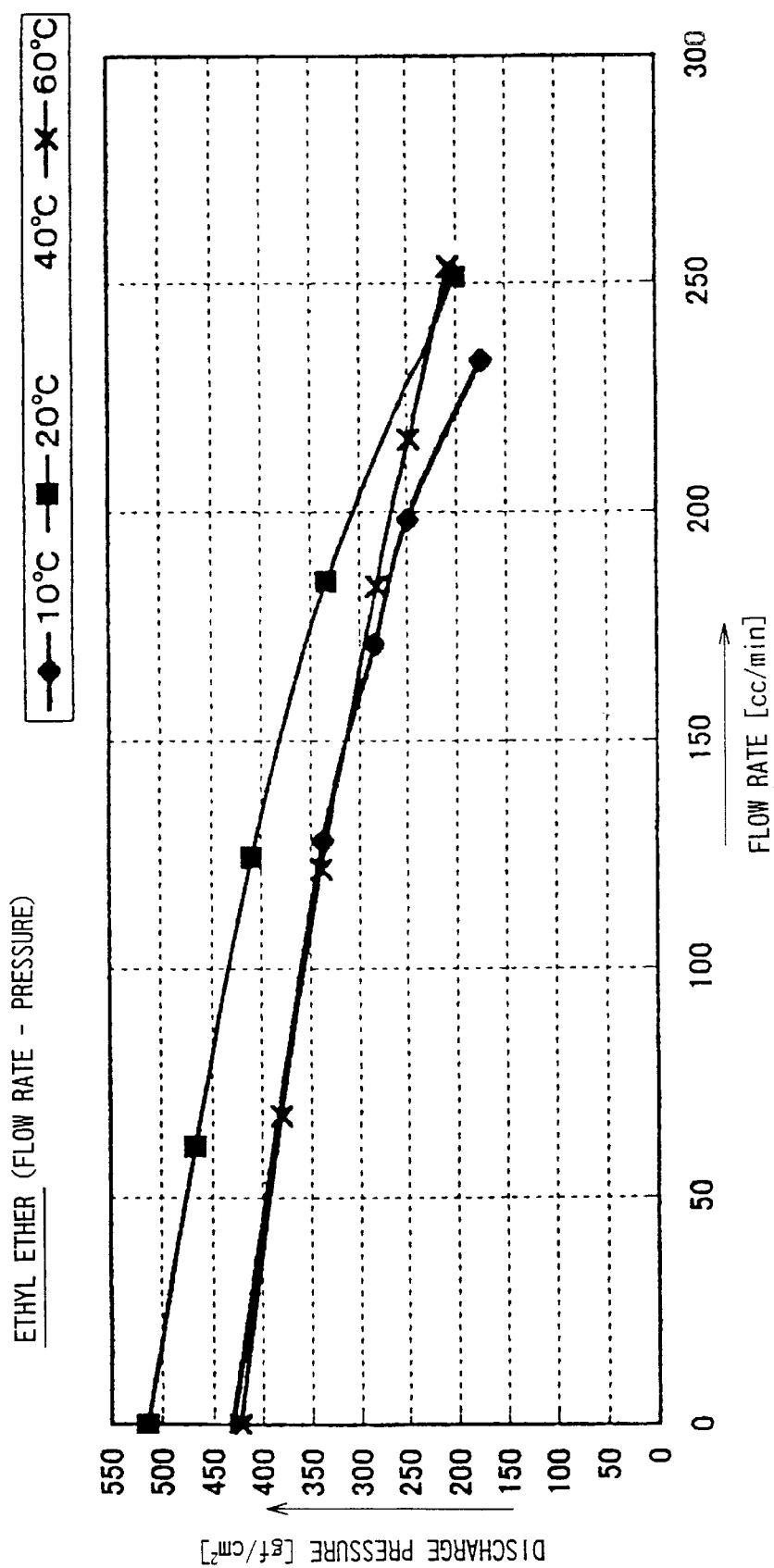
FIG. 38 is a graph showing the relationship between discharge pressure and flow rate of the pump apparatus 1 making use of ethyl ether.
Figure 39:
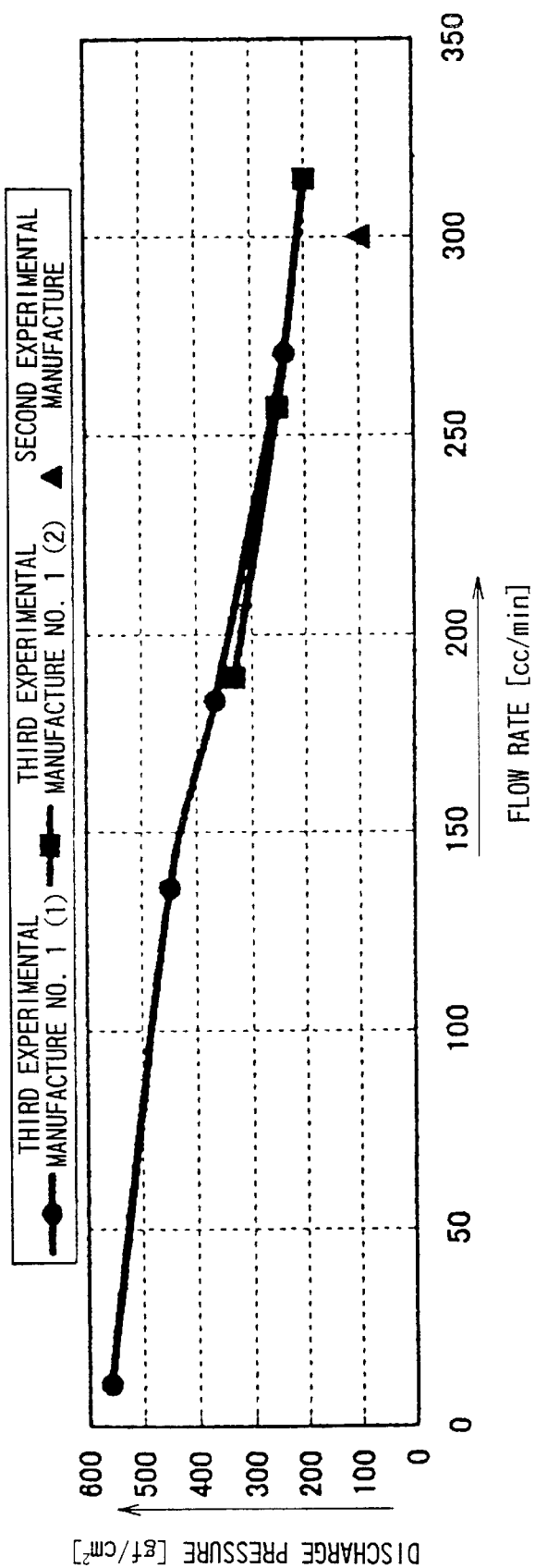
FIG. 39 is a graph showing the relationship between discharge pressure and flow rate of the pump apparatus 1 making use of liquid ammonia at 8° C.
Figure 40:
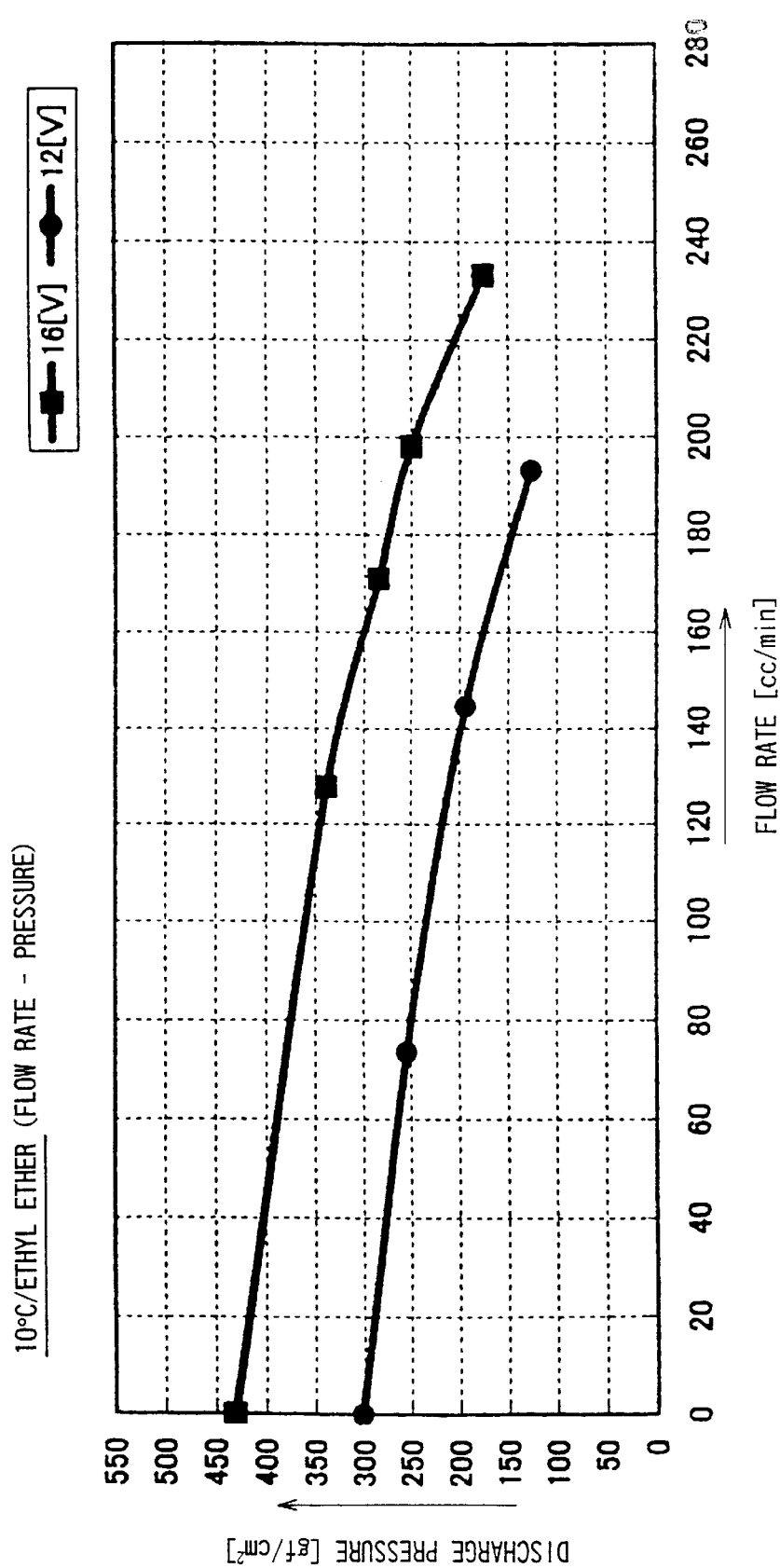
FIG. 40 is a graph showing the relationship between discharge pressure and flow rate of the pump apparatus 1 making use of ethyl ether at 10° C.
Figure 41:
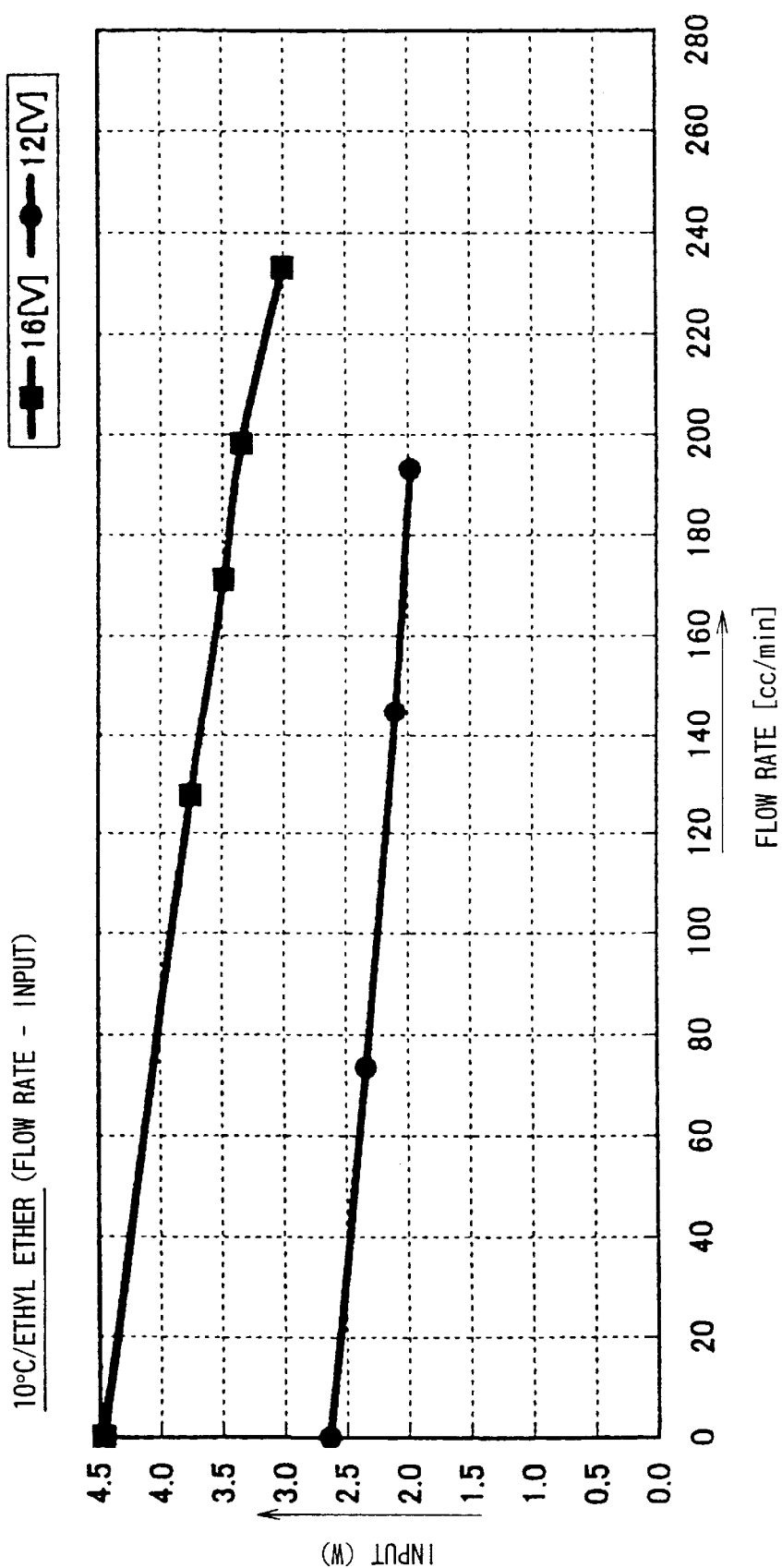
FIG. 41 is a graph showing the relationship between input power to a drive means and flow rate of the pump apparatus 1 making use of ethyl ether at 10° C.

FIG. 37 is a graph showing the relationship between discharge pressure and flow rate of the pump apparatus 1 making use of water at 5.5° C., FIG. 38 being a graph showing the relationship between discharge pressure and flow rate of the pump apparatus 1 making use of ethyl ether, and FIG. 39 being a graph showing the relationship between discharge pressure and flow rate of the pump apparatus 1 making use of liquid ammonia at 8° C. Also, FIG. 40 is a graph showing the relationship between discharge pressure and flow rate of the pump apparatus 1 making use of ethyl ether at 10° C., FIG. 41 being a graph showing the relationship between input power to the drive means and flow rate of the pump apparatus 1 making use of ethyl ether at 10° C., FIG. 42 being a graph showing the relationship between number of revolutions and flow rate of the pump apparatus 1 making use of ethyl ether at 10° C. In addition, FIGS. 40 to 42 show results in the case of using ethyl ether easy to handle while the inventors of this application have confirmed that similar results can be obtained in the case of using liquid ammonia.

Table 5 shows results of the performance test of the pump apparatus 1 making use of ethyl ether at temperature of 10° C., Table 6 showing results of the performance test of the pump apparatus 1 making use of ethyl ether at temperature of 20° C., Table 7 showing results of the performance test of the pump apparatus 1 making use of ethyl ether at temperature of 40° C., Table 8 showing results of the performance test of the pump apparatus 1 making use of ethyl ether at temperature of 60° C., Tables 9 and 10 showing results of the performance test of the pump apparatus 1 making use of ethyl ether at temperature of 60° C., and Tables 11 to 13 showing results of the performance test of the pump apparatus 1 making use of liquid ammonia at 8° C.

TABLE 5

| current | input | number of revolution | | input side pressure | | discharge side pressure | | differential pressure | flow rate | | |
|---|---|---|---|---|---|---|---|---|---|---|---|
| A | W | msec | rpm | V | gf/cm² | V | gf/cm² | gf/cm² | V | cc/min | kg/h |
| 0.188 | 3.01 | 3.74 | 4011 | −0.196 | −284 | −0.075 | −109 | 175 | 3.89 | 233 | 10.12 |
| 0.209 | 3.34 | 4.02 | 3731 | −0.193 | −279 | −0.020 | −29 | 250 | 3.30 | 198 | 8.60 |

TABLE 5-continued

| current | input | number of revolution | | input side pressure | | discharge side pressure | | differential pressure | flow rate | | |
|---|---|---|---|---|---|---|---|---|---|---|---|
| A | W | msec | rpm | V | gf/cm$^2$ | V | gf/cm$^2$ | gf/cm$^2$ | V | cc/min | kg/h |
| 0.218 | 3.49 | 4.14 | 3623 | −0.193 | −280 | 0.003 | 5 | 285 | 2.85 | 171 | 7.42 |
| 0.235 | 3.76 | 4.38 | 3425 | −0.190 | −274 | 0.044 | 64 | 338 | 2.13 | 128 | 5.54 |
| 0.279 | 4.46 | 5.14 | 2918 | −0.180 | −261 | 0.118 | 171 | 431 | 0.00 | 0 | 0.00 |

TABLE 6

| current | input | number of revolutions | | input side pressure | | discharge side pressure | | differential pressure | flow rate | | |
|---|---|---|---|---|---|---|---|---|---|---|---|
| A | W | msec | rpm | V | gf/cm$^2$ | V | gf/cm$^2$ | gf/cm$^2$ | V | cc/min | kg/h |
| 0.167 | 2.67 | 3.46 | 4335 | −0.096 | −137 | 0.044 | 63 | 201 | 4.19 | 251 | 10.76 |
| 0.196 | 3.14 | 3.84 | 3906 | −0.086 | −123 | 0.148 | 211 | 334 | 3.08 | 185 | 7.91 |
| 0.211 | 3.38 | 4.08 | 3676 | −0.079 | −112 | 0.209 | 298 | 410 | 2.07 | 124 | 5.32 |
| 0.226 | 3.62 | 4.38 | 3425 | −0.073 | −104 | 0.255 | 363 | 467 | 1.02 | 61 | 2.61 |
| 0.243 | 3.89 | 4.56 | 3289 | −0.071 | −102 | 0.289 | 413 | 515 | 0.00 | 0 | 0.00 |

TABLE 7

| current | input | number of revolutions | | input side pressure | | discharge side pressure | | differential pressure | flow rate | | |
|---|---|---|---|---|---|---|---|---|---|---|---|
| A | W | msec | rpm | V | gf/cm$^2$ | V | gf/cm$^2$ | gf/cm$^2$ | V | cc/min | kg/h |
| 0.197 | 3.15 | 3.88 | 3866 | 0.246 | 342 | 0.381 | 530 | 188 | 4.40 | 264 | 11.02 |
| 0.206 | 3.30 | 4.06 | 3695 | 0.236 | 328 | 0.421 | 585 | 257 | 3.68 | 221 | 9.20 |
| 0.215 | 3.44 | 4.16 | 3606 | 0.243 | 338 | 0.455 | 632 | 294 | 2.99 | 179 | 7.48 |
| 0.225 | 3.60 | 4.38 | 3425 | 0.246 | 342 | 0.486 | 676 | 334 | 2.29 | 137 | 5.73 |
| 0.238 | 3.81 | 4.56 | 3289 | 0.255 | 354 | 0.530 | 737 | 383 | 1.39 | 84 | 3.48 |
| 0.262 | 4.19 | 5.00 | 3000 | 0.256 | 356 | 0.576 | 801 | 445 | 0.00 | 0 | 0.00 |

TABLE 8

| current | input | number of revolution | | input side pressure | | discharge side pressure | | differential pressure | flow rate | | |
|---|---|---|---|---|---|---|---|---|---|---|---|
| A | W | msec | Rpm | V | gf/cm$^2$ | V | gf/cm$^2$ | gf/cm$^2$ | V | cc/min | kg/h |
| 0.206 | 3.30 | 4.08 | 3676 | 0.789 | 1065 | 0.943 | 1273 | 208 | 4.23 | 254 | 10.27 |
| 0.215 | 3.44 | 4.22 | 3555 | 0.785 | 1059 | 0.969 | 1308 | 249 | 3.60 | 216 | 8.74 |
| 0.220 | 3.52 | 4.34 | 3456 | 0.787 | 1062 | 0.996 | 1345 | 283 | 3.06 | 184 | 7.44 |
| 0.236 | 3.78 | 4.60 | 3261 | 0.804 | 1085 | 1.056 | 1425 | 340 | 2.03 | 122 | 4.93 |
| 0.248 | 3.97 | 4.84 | 3099 | 0.820 | 1107 | 1.102 | 1488 | 381 | 1.13 | 68 | 2.74 |
| 0.269 | 4.30 | 5.20 | 2885 | 0.783 | 1057 | 1.096 | 1480 | 423 | 0.00 | 0 | 0.00 |

TABLE 9

| current | input | number of revolution | | input side pressure | | discharge side pressure | | differential pressure | flow rate | | |
|---|---|---|---|---|---|---|---|---|---|---|---|
| A | W | Hz | rpm | V | gf/cm$^2$ | V | gf/cm$^2$ | gf/cm$^2$ | V | cc/min | kg/h |
| 0.215 | 3.44 | 59.10 | 3546 | | −141 | | 131 | 272 | | 310 | |
| 0.229 | 3.66 | 55.86 | 3352 | | −90 | | 380 | 470 | | 250 | |
| 0.240 | 3.84 | 53.47 | 3208 | | −59 | | 544 | 603 | | 200 | |
| 0.253 | 4.05 | 50.76 | 3046 | | −36 | | 699 | 735 | | 150 | |
| 0.266 | 4.26 | 48.07 | 2884 | | −22 | | 826 | 848 | | 100 | |
| 0.282 | 4.51 | 44.64 | 2678 | | −8 | | 966 | 974 | | 50 | |
| 0.295 | 4.72 | 42.73 | 2564 | | −3 | | | | | 0 | |

TABLE 10

| current | input | number of revolutions | | input side pressure | | discharge side pressure | | differential pressure | flow rate | |
|---|---|---|---|---|---|---|---|---|---|---|
| A | W | Hz | rpm | V | gf/cm$^2$ | V | gf/cm$^2$ | gf/cm$^2$ | cc/min | kg/h |
| 0.286 | 4.58 | 39.06 | 2344 | | −162 | | 157 | 319 | 330 | |
| 0.300 | 4.80 | 37.03 | 2222 | | −134 | | 330 | 464 | 300 | |
| 0.325 | 5.20 | 33.33 | 2000 | | −92 | | 587 | 679 | 250 | |
| 0.351 | 5.62 | 30.12 | 1807 | | −66 | | 828 | 894 | 200 | |
| 0.384 | 6.14 | 26.10 | 1566 | | −39 | | | | 150 | |
| 0.416 | 6.66 | 22.72 | 1363 | | −22 | | | | 100 | |
| 0.459 | 7.34 | 18.31 | 1099 | | −7 | | | | 50 | |
| 0.490 | 7.84 | 15.33 | 920 | | −2 | | | | 0 | |

TABLE 11

| current | input | number of revolution | | input side pressure | | discharge side pressure | | differential pressure | flow rate | |
|---|---|---|---|---|---|---|---|---|---|---|
| A | W | Hz | rpm | V | gf/cm$^2$ | V | gf/cm$^2$ | gf/cm$^2$ | V | cc/min | kg/h |
| 0.145 | 2.32 | 64.10 | 3846 | 2.398 | 3309 | 2.569 | 3545 | 236 | 4.52 | 271 | 11.22 |
| 0.160 | 2.56 | 59.17 | 3550 | 2.393 | 3303 | 2.659 | 3669 | 366 | 3.05 | 183 | 7.58 |
| 0.193 | 3.09 | 56.17 | 3370 | 2.417 | 3335 | 2.742 | 3784 | 449 | 2.26 | 136 | 5.62 |
| 0.250 | 4.00 | 45.45 | 2727 | 2.412 | 3329 | 2.818 | 3889 | 560 | 0.18 | 11 | 0.44 |

TABLE 12

| current | input | number of revolutions | | input side pressure | | discharge side pressure | | differential pressure | flow rate | | |
|---|---|---|---|---|---|---|---|---|---|---|---|
| A | W | V | rpm | V | gf/cm$^2$ | V | gf/cm$^2$ | gf/cm$^2$ | V | cc/min | kg/h |
| 0.150 | 2.40 | 3.99 | 3660 | 2.486 | 3431 | 2.630 | 3629 | 198 | 5.24 | 315 | 13.03 |
| 0.160 | 2.56 | 3.85 | 3531 | 2.469 | 3407 | 2.649 | 3656 | 249 | 4.29 | 257 | 10.65 |
| 0.170 | 2.72 | 3.75 | 3439 | 2.464 | 3400 | 2.704 | 3732 | 332 | 3.15 | 189 | 7.83 |

TABLE 13

| current | input | number of revolutions | | input side pressure | | discharge side pressure | | differential pressure | flow rate | | |
|---|---|---|---|---|---|---|---|---|---|---|---|
| A | W | Hz | rpm | V | gf/cm$^2$ | V | gf/cm$^2$ | gf/cm$^2$ | V | cc/min | kg/h |
| 0.120 | 1.92 | 91.90 | 5514 | 2.550 | 3519 | 2.620 | 3616 | 97 | 5.00 | 300 | 12.42 |

The pump apparatus 1 makes use of the slide bearing members 5 formed of the above-mentioned AC to support the rotating shaft 4, and so the above-mentioned construction can realize a pump apparatus of high efficiency involving a small consumption power required for operation as shown in FIGS. 37 to 42 and Tables 5 to 13.

With the above-mentioned pump apparatus 1, the drive means 9 drives the rotating shaft 4 to drive the pump body 10 connected to the rotating shaft 4 so that the refrigerant sucked through the suction port 33 can be made to flow down the flow passage 2 to be discharged from the discharge port 43. The rotating shaft 4 is rotatably supported by the bearing apparatus 6 having the slide bearing members 5. The slide bearing members 5 are formed of amorphous carbon, which possesses the above-mentioned properties and can support the rotating shaft 4 for smooth rotation. Besides, amorphous carbon possesses high chemical resistance and so is free of damage even in the case of being fitted into the fluid flow passage. Further, the rotating shaft 4, the slide bearing members 5 and the rotor 7 are fitted into the flow passage 2. The gap between the rotating shaft 4 and the slide bearing members 5 is formed to be exceedingly small as described above to further stabilize rotation of the rotating shaft 4.

Such exceedingly small gap allows entering of liquid ammonia as the refrigerant due to the capillary phenomenon. As AC possesses high chemical resistance, it is free of damage even in the case of being fitted into the fluid flow passage. Also, the slide bearing members 5 formed of AC are made irrespective of the kind of a fluid used, and accordingly liquid ammonia can be made use of as a favorable lubricant. Accordingly, the pump apparatus makes it possible to use a refrigerant being fed as a lubricant and to achieve smooth rotation of the rotating shaft. Further, since the bearing structure 6 can be formed by means of slide bearing members, it can be made simple and undergoes less failure.

Also, AC is small in coefficient of friction to suppress the generation of heat produced upon rotation of the rotating shaft 4 and can prevent thermal expansion of the rotating shaft 4 and the slide bearing members 5. Besides, even if frictional heat is generated, stable rotation could be maintained because AC is small in coefficient of thermal expansion and the gap, between the rotating shaft 4 and the slide bearing members 5 is not varied in dimension. Further, AC is small in coefficient of friction, so that with the above-mentioned small gap smooth rotation is achieved even for fluids of high viscosity such as liquid ammonia. Also, owing to small wear, even over long term use, the fluid is prevented from being contaminated with abrasion powder and the above-mentioned gap is prevented from being varied in dimension, so that smooth and stable rotation can be realized over a long term without maintenance. Accordingly, the pump apparatus can be preferably mounted on equipment used in outer space outside the stratosphere to enhance durability.

Also, provision of such rotating members in the housing 3 makes the sealing properties favorable and simplifies the construction therefor, thus enabling making the pump apparatus 1 small in size. Also, it is possible to cool the rotating shaft 4, the slide bearing members 5 and the rotor 7 to keep a stable performance of the pump. Further, the cylindrical-shaped member 11 is thin-walled to provide a cooling effect of the stator 8 surrounding the rotor chamber 55. Besides, the drive means 9 including the slide bearing members 5 and the rotor 7 is located upstream of the pump body 10 in a flow direction of the refrigerant, so that the slide bearing members 5 and the rotor 7 can be cooled prior to fluid compression by the pump body 10 and so a stable and favorable cooling effect is obtained. In this manner, such excellent pump apparatus 1 can be realized.

Also, the pump body 10 is formed of amorphous carbon, which is hardly subjected to chemical influences by the fluid, and maintains the function of the pump body over a long term, thus realizing a favorable pump apparatus 1. Further, formation of the pump body 10 of amorphous carbon can have the pump body 10 fulfilling the function of thrust bearings and bearing the thrust load of the rotating shaft 4. Therefore, the load on the slide bearing members 5 can be reduced. In this manner, the load is imposed on the pump body 10 to make it possible to reduce the slide bearing members 5 in size and enhance durability of the pump apparatus.

The above-mentioned embodiment is only exemplary of the invention and can be modified within the scope of the invention. For example, the slide bearing members 5 may be one in number or three or more. Also, the fluid may be other on than liquid ammonia.

Also, the support apparatus and the pump apparatus may be used in other equipment, such as medical equipment, than equipment used in outer space outside the stratosphere.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A support apparatus for displaceably supporting a movable member, comprising:
   a movable member comprising a rotating shaft; and
   a plurality of self-lubricating slide bearing members formed of amorphous carbon rotatably supporting said rotating shaft, said slide bearing members being radial bearings bearing a radial load of said rotating shaft;
   wherein said slide bearing members are arranged in a space in which a fluid is contained.

2. The support apparatus of claim 1, wherein a gap between said rotating shaft and said slide bearing members is dimensioned to allow entry of said fluid due to capillary phenomenon.

3. The support apparatus of claim 2, wherein said fluid is liquid ammonia.

4. The support apparatus of claim 2, wherein said gap is at least 0.75 micrometers and at most 2 micrometers.

5. The support apparatus of claim 1, wherein said support apparatus is mounted on equipment used in outer space.

6. A pump apparatus, comprising:
   a rotating shaft;
   slide bearing members formed of amorphous carbon for rotatably supporting said rotating shaft;
   a drive for drivingly rotating said rotating shaft; and
   a pump connected to said rotating shaft for pumping a fluid;
   wherein said slide bearing members are radial bearings bearing a radial load of said rotating shaft, and said pump body is formed of amorphous carbon to bear a thrust load of said rotating shaft.

7. A pump apparatus, comprising:
   a rotating shaft;
   slide bearing members for rotatably supporting said rotating shaft;
   a drive for drivingly rotating said rotating shaft; and
   a pump connected to said rotating shaft for pumping a fluid;
   wherein said slide bearing members are radial bearings bearing a radial load of said rotating shaft, and said pump body is formed of amorphous carbon to bear a thrust load of said rotating shaft.

8. A pump apparatus, comprising:
   a rotating shaft;
   a plurality of self-lubricating slide bearing members formed of amorphous carbon for rotatably supporting said rotating shaft, said slide bearing members being radial bearings bearing a radial load of said rotating shaft;
   a drive for drivingly rotating said rotating shaft; and
   a pump connected to said rotating shaft for pumping a fluid;
   wherein said slide bearing members are arranged in a space in which said fluid is contained so as to be exposed to said fluid.

9. The pump apparatus of claim 8, and further comprising a housing having a fluid flow passage which provides communication between a suction port and a discharge port wherein:
   said rotating shaft is arranged in said housing;
   said slide bearing members are fitted in said fluid flow passage in said housing;
   said drive comprises a rotor fitted in said fluid flow passage on said rotating shaft and a stator outside of said housing and surrounding said rotor; and
   said pump body is provided between ends of said fluid flow passage.

10. The pump apparatus of claim 9, wherein a gap between said rotating shaft and said slide bearing members is dimensioned to allow entry of said fluid due to capillary phenomenon.

11. The pump apparatus of claim 10, wherein said fluid is a liquid ammonia refrigerant circulated by said pump body.

12. The pump apparatus of claim 11, wherein said pump body is formed of amorphous carbon.

13. The pump apparatus of claim 8, wherein said pump apparatus is mounted on equipment used in outer space.

* * * * *